US008904286B2

(12) United States Patent
Lee et al.

(10) Patent No.: US 8,904,286 B2
(45) Date of Patent: *Dec. 2, 2014

(54) METHOD AND ARRANGEMENT FOR PROVIDING A PRIMARY ACTIONS MENU ON A WIRELESS HANDHELD COMMUNICATION DEVICE

(75) Inventors: Matthew Lee, Belleville (CA); Andrew Bocking, Waterloo (CA); Jason T. Griffin, Kitchener (CA); Steven Fyke, Waterloo (CA); Janna Corrine Louise Hickson, Waterloo (CA); Harry Major, Waterloo (CA); Sherryl Lee Scott, Toronto (CA); Matthew Bells, Waterloo (CA); Thanh Vuong, Kitchener (CA)

(73) Assignee: BlackBerry Limited, Waterloo Ontario (CA)

( * ) Notice: Subject to any disclaimer, the term of this patent is extended or adjusted under 35 U.S.C. 154(b) by 1311 days.

This patent is subject to a terminal disclaimer.

(21) Appl. No.: 11/423,875

(22) Filed: Jun. 13, 2006

(65) Prior Publication Data

US 2007/0192712 A1  Aug. 16, 2007

Related U.S. Application Data

(60) Provisional application No. 60/773,145, filed on Feb. 13, 2006, provisional application No. 60/773,799, filed on Feb. 14, 2006, provisional application No. 60/773,800, filed on Feb. 14, 2006, provisional application No. 60/773,798, filed on Feb. 14, 2006.

(51) Int. Cl.
*G06F 3/00* (2006.01)
*G06F 3/0482* (2013.01)
*G06F 3/023* (2006.01)

(52) U.S. Cl.
CPC ............ *G06F 3/0482* (2013.01); *G06F 3/0236* (2013.01)

USPC .......... 715/708; 715/745; 715/789; 715/810; 715/811; 715/812; 715/827; 715/828; 715/829; 715/841; 715/846; 715/847; 715/864

(58) Field of Classification Search
USPC ......... 715/829, 841, 847, 810, 811, 821, 825, 715/828, 708, 745, 789, 812, 827, 846, 864
See application file for complete search history.

(56) References Cited

U.S. PATENT DOCUMENTS 5,664,133 A * 9/1997 Malamud et al. ............. 715/816
5,679,943 A * 10/1997 Schultz et al. ........... 235/472.02

(Continued)

FOREIGN PATENT DOCUMENTS

DE  19743283     2/1999
DE  19743283 C1  2/1999

(Continued)

OTHER PUBLICATIONS

PCT International Search Report for PCT/CA2007/001023, Issued on Sep. 26, 2007.

(Continued)

*Primary Examiner* — Shen Shiau
(74) *Attorney, Agent, or Firm* — Jose Gutman; Fleit Gibbons Gutman Bongini & Bianco P.L.

(57) ABSTRACT

A method and hierarchical menu is provided for displaying on the screen of a wireless handheld electronic device an extended menu or a short menu, which is a subset of the corresponding extended menu. The method includes displaying a page on a screen and receiving an ambiguous request/selection when no menu is displayed. In response to the ambiguous selection, a short menu corresponding to the displayed page is displayed on the screen. Various short menus are provided with their respective menu items being dependent and adjustable based upon the position of a cursor on the displayed page, the currently opened application, and/or the previous selections. Further, a selection from the short menu is capable of displaying the extended menu corresponding thereto.

46 Claims, 24 Drawing Sheets

(56) References Cited

U.S. PATENT DOCUMENTS

| | | | |
|---|---|---|---|
| 5,786,776 A | 7/1998 | Kisaichi | |
| 5,818,437 A | 10/1998 | Grover | |
| 5,825,353 A | 10/1998 | Will | |
| 5,827,082 A | 10/1998 | Laine | |
| 5,841,374 A | 11/1998 | Abraham | |
| 5,861,821 A | 1/1999 | Kato | |
| 5,893,798 A | 4/1999 | Stambolic | |
| 5,915,228 A | 6/1999 | Kunihiro | |
| 5,920,308 A | 7/1999 | Kim | |
| 5,931,873 A | 8/1999 | Cisar | |
| 5,951,399 A * | 9/1999 | Burrell et al. | 463/46 |
| 5,953,541 A | 9/1999 | King | |
| 5,963,197 A | 10/1999 | Bacon | |
| 6,061,576 A | 5/2000 | Terrasson et al. | |
| 6,121,968 A * | 9/2000 | Arcuri et al. | 715/825 |
| 6,232,970 B1 * | 5/2001 | Bodnar et al. | 715/708 |
| 6,262,735 B1 * | 7/2001 | Etelapera | 715/854 |
| 6,286,064 B1 | 9/2001 | King | |
| 6,331,867 B1 * | 12/2001 | Eberhard et al. | 715/864 |
| 6,356,287 B1 * | 3/2002 | Ruberry et al. | 715/864 |
| 6,480,185 B1 | 11/2002 | Kiljander | |
| 6,487,396 B1 | 11/2002 | Sassi | |
| 6,664,991 B1 | 12/2003 | Chew | |
| 6,957,397 B1 | 10/2005 | Hawkins | |
| 6,959,208 B2 | 10/2005 | Tanaka | |
| 6,993,362 B1 * | 1/2006 | Aberg | 455/566 |
| 7,035,720 B2 | 4/2006 | Taxis | |
| 7,058,902 B2 * | 6/2006 | Iwema et al. | 715/810 |
| 7,083,342 B2 | 8/2006 | Griffin | |
| 7,133,706 B2 | 11/2006 | Kespohl | |
| 7,177,604 B2 | 2/2007 | Wong | |
| 7,231,229 B1 | 6/2007 | Hawkins | |
| 7,246,320 B2 * | 7/2007 | Foucher et al. | 715/739 |
| 7,376,913 B1 * | 5/2008 | Fleck et al. | 715/864 |
| 7,454,713 B2 * | 11/2008 | Spalink et al. | 715/828 |
| 7,511,700 B2 | 3/2009 | Skillman | |
| 7,532,198 B2 | 5/2009 | Lazaridis | |
| 7,568,169 B2 * | 7/2009 | Lee | 715/812 |
| 7,761,810 B2 * | 7/2010 | Shim et al. | 715/827 |
| 7,802,201 B2 * | 9/2010 | Lee et al. | 715/825 |
| 8,234,588 B2 * | 7/2012 | Lee et al. | 715/825 |
| 2002/0142738 A1 | 10/2002 | Jambie | |
| 2002/0167548 A1 | 11/2002 | Murray | |
| 2003/0032455 A1 * | 2/2003 | Watanabe et al. | 455/566 |
| 2003/0064757 A1 | 4/2003 | Yamadera et al. | |
| 2004/0015500 A1 | 1/2004 | Pugliese | |
| 2004/0021647 A1 * | 2/2004 | Iwema et al. | 345/179 |
| 2004/0043758 A1 * | 3/2004 | Sorvari et al. | 455/414.1 |
| 2004/0142720 A1 | 7/2004 | Smethers | |
| 2004/0165924 A1 | 8/2004 | Griffin | |
| 2004/0229663 A1 * | 11/2004 | Tosey et al. | 455/575.1 |
| 2004/0261031 A1 | 12/2004 | Tuomainen et al. | |
| 2005/0076309 A1 * | 4/2005 | Goldsmith | 715/811 |
| 2005/0119031 A1 * | 6/2005 | Spalink et al. | 455/566 |
| 2005/0125570 A1 | 6/2005 | Olodort et al. | |
| 2005/0190083 A1 | 9/2005 | Tyneski et al. | |
| 2005/0246352 A1 * | 11/2005 | Moore et al. | 707/100 |
| 2005/0287953 A1 | 12/2005 | Ikeda | |
| 2006/0004873 A1 * | 1/2006 | Wong et al. | 707/104.1 |
| 2006/0007129 A1 | 1/2006 | Pletikosa | |
| 2006/0022947 A1 | 2/2006 | Griffin | |
| 2006/0036568 A1 * | 2/2006 | Moore et al. | 707/1 |
| 2006/0036945 A1 * | 2/2006 | Radtke et al. | 715/708 |
| 2006/0041848 A1 | 2/2006 | Lira | |
| 2006/0095538 A1 | 5/2006 | Rehman | |
| 2006/0121939 A1 * | 6/2006 | Anwar et al. | 455/556.2 |
| 2006/0184896 A1 * | 8/2006 | Foucher et al. | 715/810 |
| 2006/0253801 A1 | 11/2006 | Okaro | |
| 2006/0265653 A1 * | 11/2006 | Paasonen et al. | 715/704 |
| 2007/0192705 A1 * | 8/2007 | Lee | 715/739 |
| 2007/0192708 A1 * | 8/2007 | Lee et al. | 715/752 |
| 2007/0192711 A1 * | 8/2007 | Lee et al. | 715/764 |
| 2007/0192713 A1 * | 8/2007 | Lee et al. | 715/764 |
| 2007/0192714 A1 * | 8/2007 | Lee et al. | 715/764 |
| 2007/0192736 A1 * | 8/2007 | Lee et al. | 715/810 |
| 2007/0192737 A1 * | 8/2007 | Lee | 715/810 |
| 2007/0192738 A1 * | 8/2007 | Lee | 715/810 |
| 2007/0192742 A1 * | 8/2007 | Lee et al. | 715/828 |
| 2007/0192743 A1 * | 8/2007 | Lee | 715/828 |
| 2007/0192750 A1 * | 8/2007 | Lee et al. | 715/864 |
| 2007/0211034 A1 * | 9/2007 | Griffin et al. | 345/169 |
| 2007/0252817 A1 * | 11/2007 | Griffin et al. | 345/168 |
| 2007/0254688 A1 * | 11/2007 | Griffin et al. | 455/550.1 |
| 2007/0254689 A1 * | 11/2007 | Griffin et al. | 455/550.1 |
| 2007/0254690 A1 * | 11/2007 | Griffin et al. | 455/550.1 |
| 2007/0254698 A1 * | 11/2007 | Griffin et al. | 455/556.2 |
| 2007/0254699 A1 * | 11/2007 | Griffin et al. | 455/556.2 |
| 2007/0254700 A1 * | 11/2007 | Griffin et al. | 455/556.2 |
| 2007/0254701 A1 * | 11/2007 | Griffin et al. | 455/556.2 |
| 2007/0254702 A1 * | 11/2007 | Griffin et al. | 455/556.2 |
| 2007/0254703 A1 * | 11/2007 | Griffin et al. | 455/556.2 |
| 2007/0254704 A1 * | 11/2007 | Griffin et al. | 455/556.2 |
| 2007/0254705 A1 * | 11/2007 | Griffin et al. | 455/556.2 |
| 2007/0254706 A1 * | 11/2007 | Griffin et al. | 455/556.2 |
| 2007/0254707 A1 * | 11/2007 | Griffin et al. | 455/556.2 |
| 2007/0254708 A1 * | 11/2007 | Griffin et al. | 455/556.2 |
| 2007/0254721 A1 * | 11/2007 | Griffin et al. | 455/566 |
| 2007/0259697 A1 * | 11/2007 | Griffin et al. | 455/566 |
| 2007/0268259 A1 * | 11/2007 | Griffin et al. | 345/169 |
| 2007/0281675 A1 | 12/2007 | Pletikosa | |
| 2007/0281733 A1 * | 12/2007 | Griffin et al. | 455/550.1 |
| 2008/0057941 A1 | 3/2008 | Scott | |
| 2008/0057985 A1 | 3/2008 | Tao | |
| 2008/0163112 A1 * | 7/2008 | Lee et al. | 715/810 |
| 2008/0163121 A1 * | 7/2008 | Lee et al. | 715/845 |
| 2009/0037846 A1 * | 2/2009 | Spalink et al. | 715/825 |

FOREIGN PATENT DOCUMENTS

| | | |
|---|---|---|
| EP | 0886414 A | 12/1998 |
| EP | 1521168 | 4/2005 |
| EP | 1521168 A2 | 4/2005 |
| EP | 1840708 | 10/2007 |
| WO | 2004086211 A | 10/2004 |
| WO | WO-2004/086211 | 10/2004 |
| WO | WO-2007/143821 | 12/2007 |

OTHER PUBLICATIONS

European Search Report for EP 06253027, Issued on Sep. 21, 2006.
European Search Report for EP 06253064, Issued on Sep. 21, 2006.
European Search Report for EP 06253055, Issued on Sep. 21, 2006.
European Search Report for EP 06253063, Issued on Sep. 21, 2006.
Mackenzie, I.S. "Text Entry for Mobile Computing: Models and Methods", Theory and Practice. Human Computer Interaction, 2002, vol. 17, pp. 147-198. Copyright 2002.
"Context menu" (Wikipedia) Oct. 8, 2005, retrieved on Mar. 11, 2008 from http://web.archive.org/web/20051008132509/http://en.wikipedia.org/wiki/Context_menu.
"Dell(TM) Axim(TM) X50 Owner's Manual" (Dell) Sep. 2004, retrieved on Mar. 11, 2008, from http://support.dell.com/support/edocs/systems/aximx50/en/om/N6966bk1.pdf.
"Dell stellt neue PDA—Topklasse vor" (Heise) Dec. 12, 2004, retrieved on Mar. 11, 2008 from http://www.heise.de/newsticker/suche/ergebnis?rm+result;q=AXIM%20X50;url=/newsticker/meldung/52069/;words=Axim%20x50%20X50.
"Special Edition using Microsoft® Windows® 2000 Professional" (Robert Cowart, Brian Knittel) Feb. 24, 2000, ISBN: 978-0-7897-2125-9 [XP001167394].
Decision to refuse European Patent Application; Jul. 16, 2009; EP 06253027.4.
Heise, , "Dell stellt neue PDA-Topklasse vor", "Dell stellt neue PDA-Topklasse vor" (Heise) Dec. 12, 2004, retrieved on Mar. 11, 2008 from the URL http://www.heise.de/newsticker/suche/ergebnis?rm=result;q=AXIM%20X50;url=/newsticker/rneldung/52069/;words=Axim%20x50 Dec. 12, 2004.

* cited by examiner

METHOD AND ARRANGEMENT FOR PROVIDING A PRIMARY ACTIONS MENU ON A WIRELESS HANDHELD COMMUNICATION DEVICE

CROSS-REFERENCE TO RELATED APPLICATIONS

The present application claims the benefit of U.S. Provisional Application Nos. 60/773,145, 60/773,798, 60/773,799, and 60/773,800 filed Feb. 13, 2006, Feb. 14, 2006, Feb. 14, 2006, and Feb. 14, 2006, respectively. Said applications are expressly incorporated herein by reference in their entirety.

FIELD

The present disclosure generally relates to the user interface of software applications, and more particularly, to a hierarchical in-place menu that replaces parent menus with submenus.

BACKGROUND

Most conventional application programs are menu-driven as opposed to being command-driven. Menu-driven applications provide a list of possible commands or options from which a user may choose, while command-driven applications require users to enter explicit commands. Thus, menu-driven applications are generally easier for the average user to learn than are command-driven applications. Menus are typically implemented as a list of textual or graphical choices (i.e., menu items) from which a user can choose. Thus, menus allow a user to select a menu item, for example, by pointing to the item with a mouse and then clicking on the item. Examples of other methods of selecting menu items include highlighting an item and then hitting the "return" key or "enter" key, and pressing on a menu item through a touch-sensitive screen.

One particularly useful type of menu is a hierarchical menu. An example of a conventional hierarchical menu 100 is illustrated in FIG. 1. As shown in FIG. 1, hierarchical menus 100 typically present a parent menu 115 that has selectable menu items. The selection of each menu item normally causes another menu, or submenu 116 to be displayed next to the currently displayed menu. The submenu 116 has additional menu choices that are related to the selected parent menu item which results in the display of the submenu. The depth of a hierarchical menu can extend in this manner to many levels of submenus (shown as four levels in FIG. 1).

The example menu shown in FIG. 1 illustrates how conventional hierarchical menus 100 generally lay out from left to right across a display screen as menu choices are selected. This menu format provides various advantages such as retaining previous and current menus on the display screen at the same time. This provides a historical menu map as menu selections are made and their corresponding submenus are displayed across the screen. Users can therefore review previous menu selections that have been made while progressing to the most recently displayed menu, making it easier to move between different menu items and different menu levels.

Although such hierarchical menus provide useful advantages, there are scenarios in which their use is impracticable. One such scenario is when hierarchical menus are used on devices having small display screens. The problems presented when attempting to implement conventional hierarchical menus on small-screen devices have generally discouraged the use of hierarchical menus with such devices. FIG. 2 illustrates an example of how the hierarchical menu 100 of FIG. 1 may appear on the display screen of a small-screen device, for example, a PDA 300a.

As indicated above, hierarchical menus generally lay out across the display screen from left to right. On small-screen devices where the room on the screen is not wide enough to accommodate all of the menus, the menus often lay out across the screen in both directions, from left to right and back again. In this scenario, the menus typically begin to overlap one another, creating various problems. One problem is that the overlapping menus can be confusing to the user, as FIG. 2 illustrates. Overlapping menus can make it difficult for a user to discern previous menu selections which can, in turn, make it difficult to determine how to return to previous menus to make different menu selections. Thus, one of the intended benefits of a hierarchical menu can be undermined when the hierarchical menu is implemented on a small-screen device.

Overlapping menus can also create problems with small-screen devices (as well as others) that employ pen-based or stylus-based touch-sensitive screens. With such devices, it is often difficult to maintain contact continuity between menus on the screen when the menus are overlapping. In other words, it is easy to move off of menus with small-screen, touch-based devices. If continuity is lost when moving from one menu to another, menus will often disappear from the screen, causing the user to have to go back and reactivate the menu from a prior menu. This problem becomes worse when using pen-based devices that "track". In the present context, the terminology of "tracking" is used to indicate a situation in which a cursor on the screen follows (tracks) the movement of the pen as the pen moves over the screen even though the pen is not touching the screen. Tracking is lost if the pen is pulled too far away from the screen. Thus, pen-based devices that "track" tend to lose more menus when hierarchical menus are employed.

One method of addressing this issue involves displaying submenus in place of a parent menu, and vice versa, when the appropriate menu items are selected from within the parent menus and submenus. FIG. 5 illustrates an exemplary hierarchical in-place menu 500. The dashed lines 506 of FIG. 5 are intended to indicate that each of the menus 502, 504, 510 and 512 of the hierarchical in-place menu 500 are displayed separately from or "in place" of one another. Like a typical hierarchical menu, the depth of a hierarchical in-place menu 500 can extend in this manner to many levels of submenus such as second, third, fourth and fifth levels, with submenus being parent menus to other submenus. Parent menu items selected from within parent menus are displayed within submenus as links back to previous parent menus and are separated from that submenu's items by a divider 514. For example, parent menu item "Launch App" shown in parent menu 502 includes a forward pointer 508 that indicates a submenu will replace parent menu 502 upon selection of "Launch App" from within parent menu 502. In each of the submenus 504, 510 and 512, "Launch App" has a backward pointing arrow to allow going back to a previous menu in the hierarchy.

However, another disadvantage of hierarchical menus in general is the number of menu items presented in each menu. Each of the menus provides the full complement of available menu items. This can be overwhelming for a novice user and irritating to an experienced user. This problem is exacerbated to an extent by the addition of a hierarchical history of parent menus added to the list.

Another approach to the problem of dealing with a full or extended menu, which lists all available menu items at that particular level uses a radio communication device that provides an extended menu and a short menu that is a subset of the extended menu and the ability to select between the two. The short menu is a dynamic menu that is built by the user by selecting menu items from the corresponding extended menu to include in the short menu.

A disadvantage of this approach is that the novice user will be further overwhelmed with having to build the various short menus. The experienced user may be disinclined from having to go through the initial set-up procedure of the short menus.

Another disadvantage of a hierarchical menu system is the requirement of proceeding through each menu of the hierarchy to reach the desired action or menu item. This process adds various steps that can frustrate users, due to the lack of intuitiveness to getting from point A to point B from the user's point of view.

Accordingly, as the demand for small-screen devices capable of running increasingly complex applications continues to grow, the need exists for a way to implement hierarchical menus that overcomes the various disadvantages with conventional hierarchical menus.

BRIEF DESCRIPTION OF THE DRAWINGS

Exemplary methods and arrangements conducted and configured according to the advantageous solutions presented herein are depicted in the accompanying drawings where in:

FIG. 3e illustrates an exemplary Dvorak keyboard layout;

FIG. 3f illustrates a QWERTY keyboard layout paired with a traditional ten-key keyboard;

FIG. 3g illustrates ten digits comprising the numerals 0-9 arranged as on a telephone keypad, including the * and # astride the zero;

FIG. 3h illustrates a numeric phone key arrangement according to the ITU Standard E.161 including both numerals and letters;

DETAILED DESCRIPTION

Figure 1:
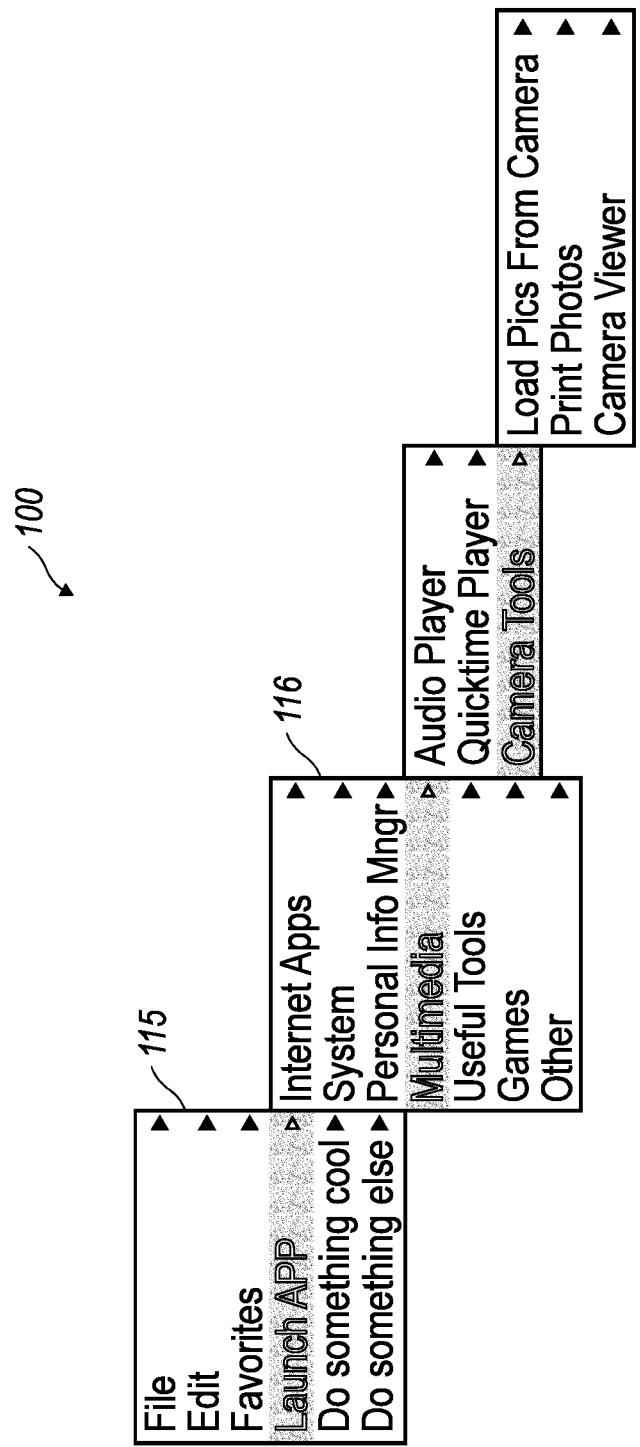
FIG. 1 illustrates one type of hierarchical menu.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held. Therefore the size of the device must be kept relatively small; of its dimensions, limiting the width of the device is most important with respect to assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent with importance placed on maintaining device hand-cradleablability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" of the front face of the device where it is most advantageous to include a display screen that outputs information to the user and which is preferably above a keyboard utilized for data entry into the device by the user. If the screen is provided below the keyboard, a problem occurs in being able to see the screen while inputting data. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter. This is preferred by some users because it can be arranged to resemble a standard keyboard with which they are most familiar. In this regard, the associated letters can be advantageously organized in QWERTY, QWERTZ or AZERTY layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith. This means that fewer keys can be included which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation; a problem the full keyboard avoids. Preferably, this character discrimination is accomplished utilizing disambiguation software accommodated within the device. As with the other software programs embodied within the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device.

Keys, typically of a push-button or push-pad nature, perform well as data entry devices but present problems to the user when they must also be used to affect navigational control over a screen-cursor. In order to solve this problem the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. A particularly usable embodiment provides the navigational tool in the form of a trackball which is easily utilized to instruct two-dimensional screen cursor movement in substantially any direction, as well as act as an actuator when the ball of the trackball is depressible like a button. The placement of the trackball is preferably above the keyboard and below the display screen; here, it avoids interference during keyboarding and does not block the user's view of the display screen during use.

In some configurations, the handheld electronic device may be standalone in that it is not connectable to the "outside world." One example would be a PDA that stores such things as calendars and contact information, but is not capable of synchronizing or communicating with other devices. In most situations such isolation will be detrimentally viewed in that at least synchronization is a highly desired characteristic of handheld devices today. Moreover, the utility of the device is significantly enhanced when connectable within a system, and particularly when connectable on a wireless basis in a system in which both voice and text messaging are accommodated.

In one respect, the present disclosure is directed toward a method for displaying an abbreviated menu on the screen of a handheld electronic device 300b, variously configured as described above, at the request of the user. Typical examples of such devices include PDAs 300a, mobile telephones and multi-mode communicator devices such as those capable of transmitting both voice and text messages such as email. The method includes displaying a cursor-navigable page on a screen 322 of the handheld electronic device 300b. One example is the text of an email message. Next, the user initiates an ambiguous request for the display of menu options corresponding to the displayed page while a cursor is positioned at a location on the page that is not visually signified for menu display actuation. For instance, with the screen cursor positioned at a location in the body of the email message 620, but where there is no visual indicator that the location is one which will cause a menu to be displayed if actuated, an action is taken such as pressing a button on the handheld electronic device 300b that indicates the user's desire to take an action with respect to the displayed page (email message 620). There are several actions which might be taken with respect to the email message 620, but none has been specified; therefore, the request is termed ambiguous. Responsively, the handheld electronic device 300b, under the control of an included microprocessor 338, displays a short menu 624 having a first list of menu items which is a subset of a second list of menu items that make up an extended menu 618 associated with the displayed page. The first list of menu items has been assessed a higher probability for being user-selected or desired than at least some of the remaining items of the second list. This means that there is a long list (the second list) of actions that might be taken when the email message is displayed, but there is also a short list (the first list), which is a subset of the long list, that has been assessed to be more frequently selected/desired. It is the short list of selectable actions that is displayed in response to the user's ambiguous request.

In at least one version of the device, the user's ambiguous request is made through an auxiliary user input device on the handheld electronic device. One example of the auxiliary user input device is a navigation tool that controls movement of the cursor on the screen of the handheld electronic device, such as a trackball.

The device may also include an input that issues non-ambiguous request to display the extended menu associated with the displayed page, and which may be simply constituted by an actuable button or the like.

In order to facilitate usability, it is also contemplated that selectable items on the short list can include choices to expand the short menu 624 to the extended menu 618, or to close the short menu. In order to reinforce the commonality between the extended menu choice on the short list (the first list) and a dedicated push-button for the long list (the second list), each is marked with a similar insignia.

In order to take full advantage of the small screen of the handheld device, the short menu is displayed on the screen in place of the displayed page, and preferably fills a substantial entirety of the screen.

As intimated above, the handheld electronic device can take the form of a wireless handheld communication device that transmits data to, and receives data from a communication network utilizing radio frequency signals. By way of example and not limitation, the data transmitted between the handheld electronic device and the communication network might exemplarily support voice and textual messaging.

To further enhance usability, the handheld electronic device can be sized to be cradled in the palm of a user's hand. Owing to this small size, the device can be easily grasped by a user and cradled in the palm of the hand. In at least one configuration, the size of the device is sufficiently small to allow the user to use only fingers and/or thumbs (digits) of the same hand within which the device is grasped to input data.

In order to achieve comfortable cradling and still provide sufficient "real estate" for the necessary inputs and displays, the device can be advantageously longer than it is wide. This is because it is the width of the device that primarily impacts the fit of the device in a user's hand. To that end, the handheld electronic device preferably measures between approximately two and three inches.

The device also carries a keyboard suitable for accommodating textual input, and in a preferred embodiment, the navigation tool is located essentially between the keyboard and the screen of the handheld electronic device. In one version, a full keyboard is provided that includes a plurality of keys with which alphabetic letters are associated, one letter per key. In the instance of the English language, the means at least twenty-six keys for the twenty-six letter of the alphabet. Alternatively, the keyboard may be of a reduced configuration in which at least a portion of the individual keys have multiple letters associated therewith. This means that for the English language, fewer than twenty-six letter keys will be included in such a reduced keyboard example.

Benefits of the disclosed hierarchical menu system include the ability to implement a hierarchical menu on devices having varying screen sizes, including small-screen devices. The disclosed hierarchical menu permits the display of one menu at a time. In an almost intuitive manner, the methods disclosed allow the user to make an ambiguous selection to directly open a particular item on a displayed page or to display a short menu of items typically used with a displayed page. This reduces user confusion and enhances usability of the system. By using a "menu" item on the short menu or a "menu" key, the user always has the option to view the extended menu associated with the displayed page. By using a "back" menu item or key, the user can navigate to previously displayed menus within the string of historically selected without cluttering the displayed menus with such historical items.

Figure 3A:
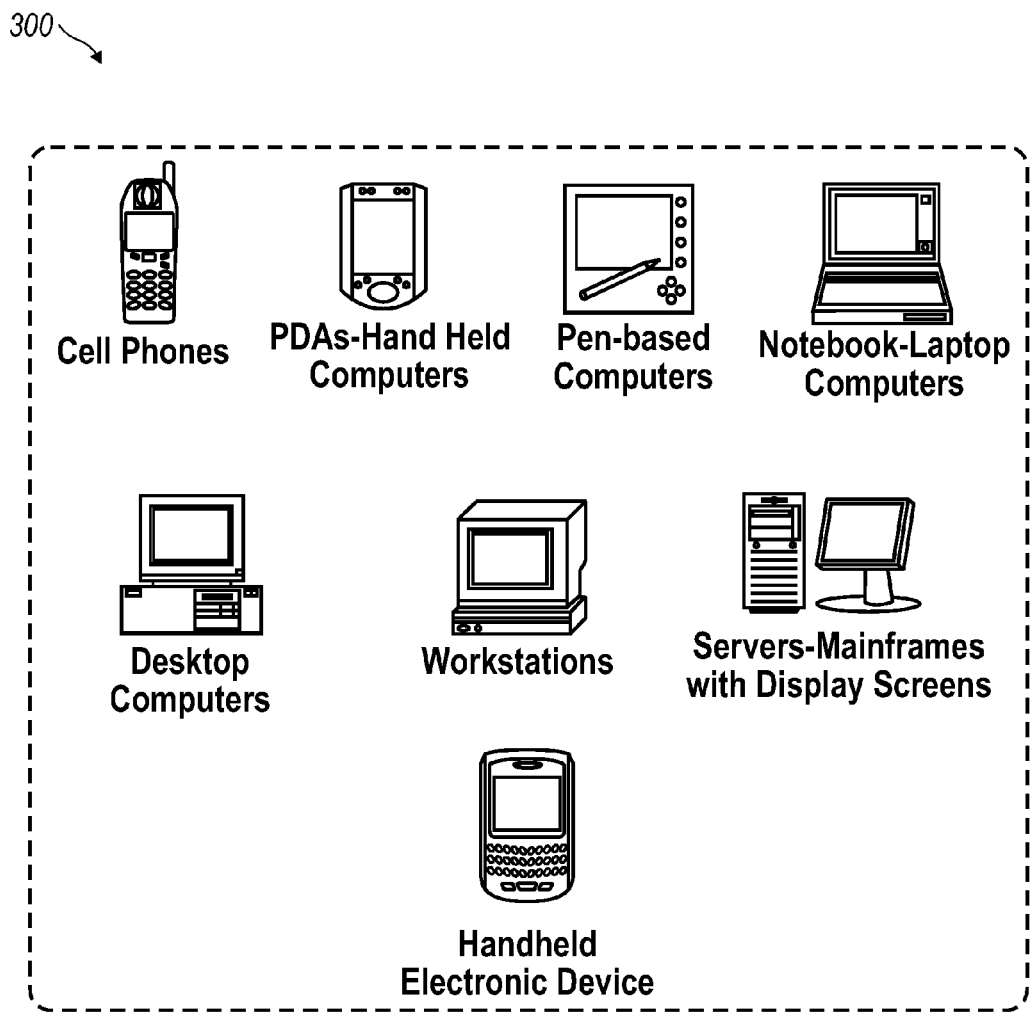
FIG. 3a illustrates various examples of computing devices that are suitable environments in which to implement embodiments of hierarchical menus.

FIG. 3a shows various examples of computers 300 that are suitable environments in which to implement hierarchical menus. A computer 300 is typically capable of performing common computing functions, such as email, calendaring, task organization, word processing, Web browsing, and so on. Computer 300 may run an open platform operating system, such as the Windows® brand operating systems from Microsoft Corporation. Computer 300 may be implemented as any one of various computing devices that has a display screen and supports a GUI (graphical user interface). Such computing devices can include, for example, cell phones, PDAs 300a and other handheld electronic devices 300b, pen-based and/or touch-based computers with touch-sensitive screens, notebooks, laptops, desktops, workstations, server and mainframe computers that include displays, and the like. One exemplary implementation of computer 300 is described in more detail below with reference to FIG. 9.

In the embodiments described below, computer 300 is generally discussed as being implemented as a small-screen, handheld electronic device 300b such as, for example, a cell phone, or a PDA (personal digital assistant) 300a. Such devices generally provide more limited computing capabilities than a typical personal computer, such as information storage and retrieval capabilities for personal or business use, including keeping schedule calendars and address book information. Such devices usually offer some version of an operating system and various applications. Thus, a computer 300 implemented as a small-screen, handheld electronic device 300b include email, phone, SMS (short message service), IM (instant messaging), organizer and Web applications.

Figure 2:
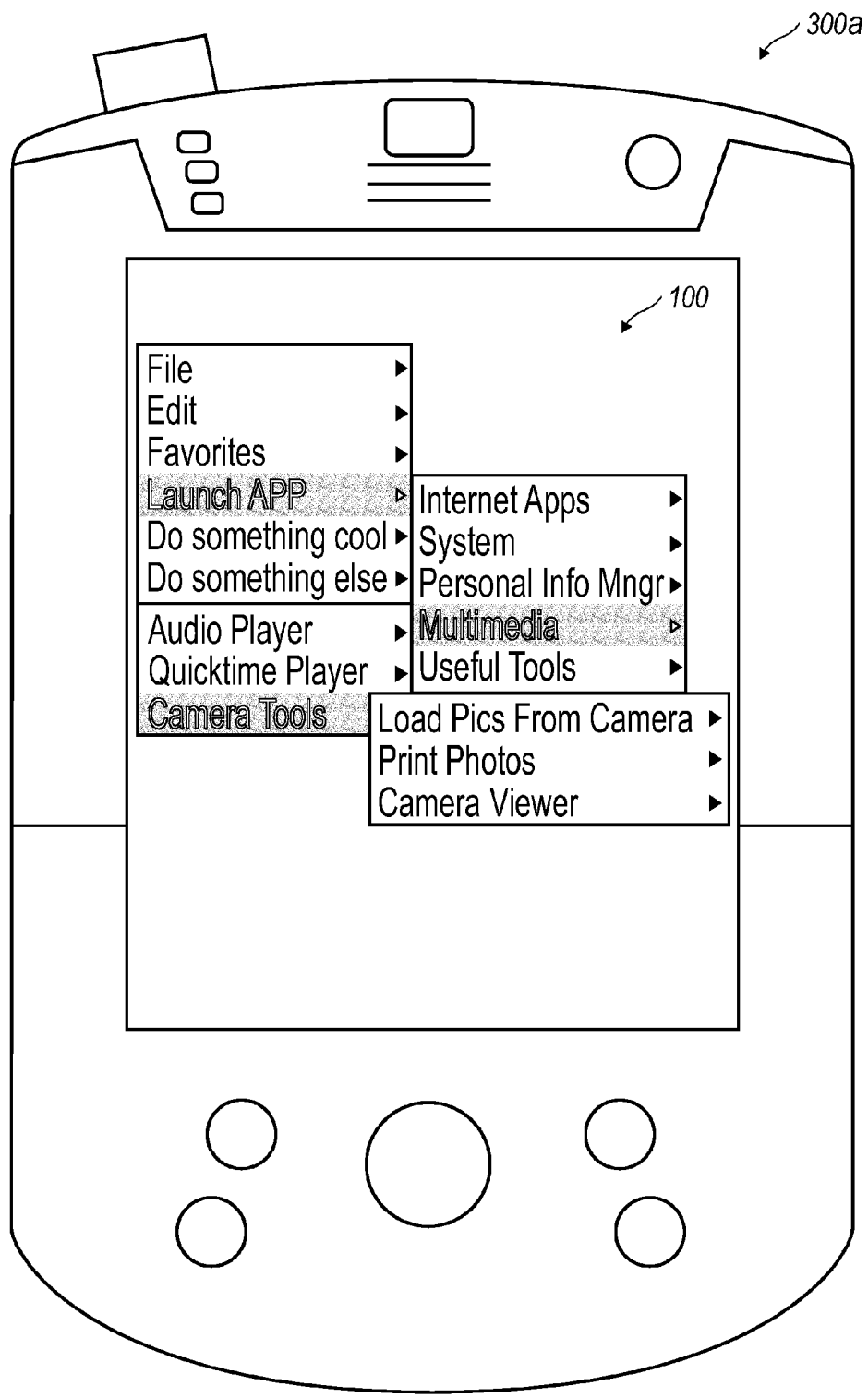
FIG. 2 illustrates an attempt at implementing the hierarchical menu of FIG. 1 on a small-screen computing device.
Figure 4:
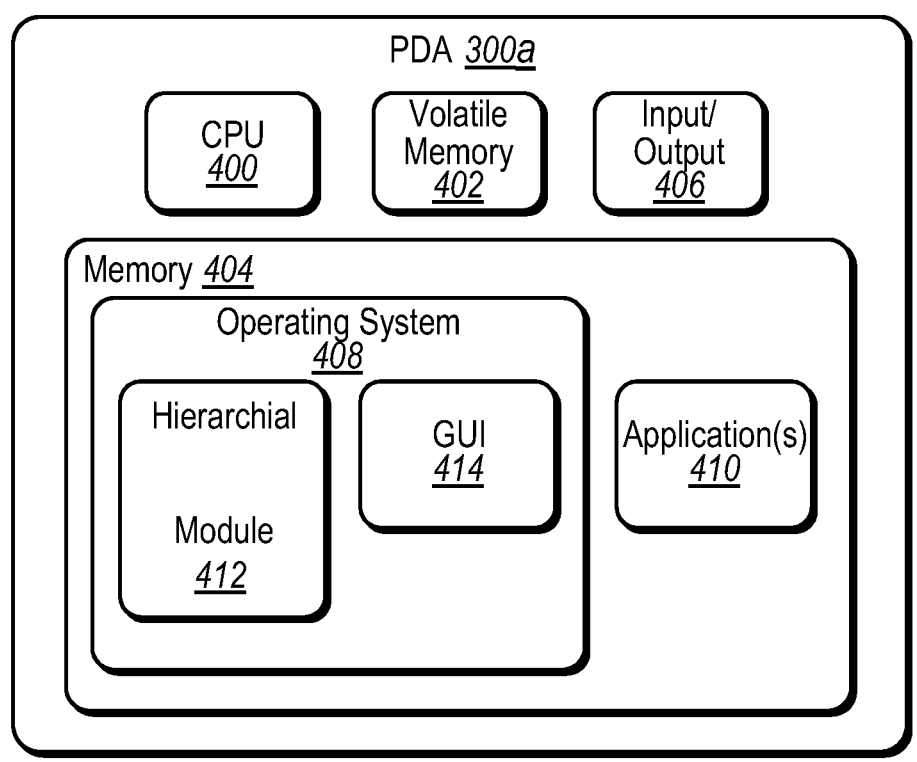
FIG. 4 illustrates an exemplary embodiment of a computer in the form of a PDA that is suitable for implementing a hierarchical menu.
Figure 5:
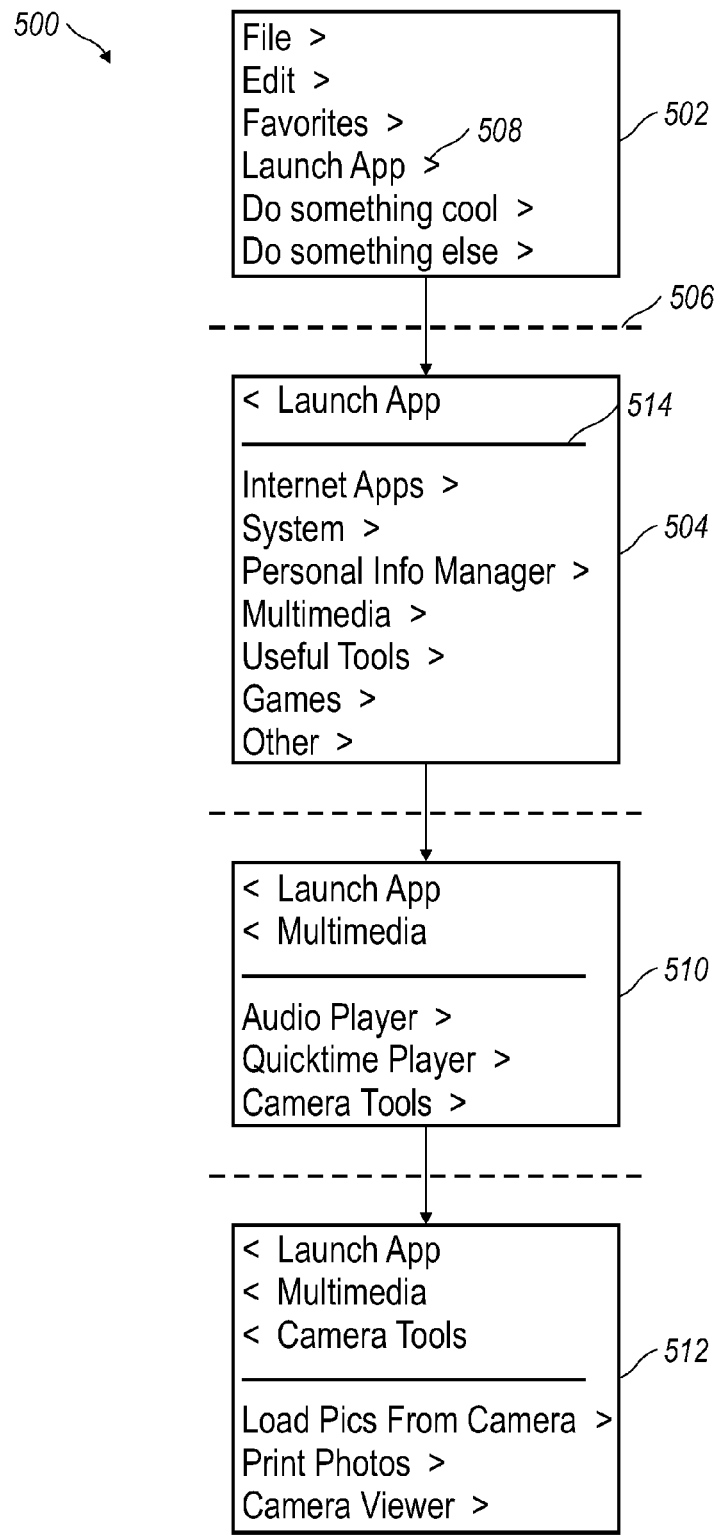
FIG. 5 illustrates a hierarchical menu implemented on a computer such as a PDA.

FIGS. 2 and 4 illustrate an exemplary embodiment of a computer 300 suitable for implementing an embodiment of hierarchical menu with ambiguous selection. Computer 300 is implemented generally as a small-screen device such as a PDA 300a (personal digital assistant) in the exemplary embodiments of FIGS. 2 and 4.

PDA 300a includes a processor 400, a volatile memory 402 (i.e., RAM), and a nonvolatile memory 404 (e.g., ROM, hard disk, floppy disk, CD-ROM, etc.). Nonvolatile memory 404 generally provides storage of computer/processor-readable instructions, data structures, program modules and other data for PDA 300a. PDA 300a may also include various input/output 406 devices. Examples of input device 406 (not shown) can include a mouse or trackball for moving a cursor and making selections, a touch-sensitive display screen, a stylus pen for making menu input selections on a touch-sensitive display screen displaying menu options and/or soft buttons of a GUI (graphical user interface), hard buttons on the PDA 300a structure, and so on. Output device 406 examples (not shown) can include a display screen, a touch-sensitive display screen, an audio speaker, and so on.

PDA 300a implements an operating system (OS) 408 on processor 400 from volatile memory 402. The OS 408 is stored in memory 404 and initially loaded from memory 404 into volatile memory 402 by a boot program (not shown). The OS 408 is generally configured to manage other application programs 410 that are also stored in memory 404 and executable on processor 400 from volatile memory 402. The OS 408 honors requests for services made by application programs 410 through predefined application program interfaces (APIs). More specifically, the OS 408 typically determines the order in which multiple applications 410 execute on processor 400 and the execution time allotted for each application 410, manages the sharing of memory 402 among multiple applications 410, handles input and output to and from attached hardware devices (e.g., hard disks, printers, dial-up ports), and so on. In addition, users can typically interact directly with the OS 408 through a user interface such as a command language or graphical user interface.

PDA 300a typically implements various application programs 410 stored in memory 404 and executable on processor 400. Such applications 410 might include software programs implementing, for example, word processors, spread sheets, browsers, file share programs, database management systems (DBMS), peer-to-peer applications, multimedia players, computer-aided design tools and the like. Most applications 410 are menu-driven programs that provide a list of possible commands or options from which a user may choose in order to implement various application functions on the PDA 300a.

The manner in which menu selections are made often depends upon the particular type of computer device 300 running an application 410. For example, entering a menu selection on a computer 300 (for example, a desktop computer) that has a mouse as an input device 406 may occur by pointing to a menu item with a mouse and then clicking on the item. Many small-screen computing devices 300, such as PDA 300a of FIG. 4, implement GUIs (graphical user interfaces) on touch-sensitive screens through which menu selections can be made by pressing a pen or stylus to desired menu choices. Other methods of selecting menu items include, for example, highlighting menu items and then hitting the "return" key or "enter" key. Yet other methods of selecting menu items include depressing or clicking a navigation tool like a trackball or trackwheel.

The menuing task is generally performed by a menuing subsystem of an operating system executing on a computer 300. Accordingly, as illustrated in PDA 300a of the FIG. 4 embodiment, a "hierarchical menu with ambiguous selection module" 412 is implemented as part of operating system 408. In general, the menu module 412 is configured to receive menu calls from various applications 410 and to service those calls by displaying a menu on a display screen according to the parameters provided by the application 410 making the menu call. The menu module 412 also manages menu selections made under a GUI 414 supported by operating system 408. Although modules 412 and 414 are illustrated as being part of operating system 408, it is noted that such modules might also function as stand-alone modules stored in memory 404 and executable on processor 400. In general, although the functioning of modules 412 and 414 as part of operating system 408 is preferred, it is not intended as a limitation regarding their implementation by a computer 300.

In addition to managing typical menuing functions, the "hierarchical menu with ambiguous selection module" 412 implements a hierarchical menu in accordance with application programs 410 that support hierarchical menus. Thus, for applications 410 designed to provide hierarchical menus, menu module 412 is configured to implement those hierarchical menus as hierarchical menus with ambiguous selection. The implementation of a hierarchical menu as a hierarchical menu with ambiguous selection can occur automatically for any application making a hierarchical menu call to operating system 408, or it can occur based on a specific request from an application 410 to implement the hierarchical menu as a hierarchical menu with ambiguous selection. Thus, small-screen computer device manufacturers can configure devices to automatically provide hierarchical menus with ambiguous selection for application developers. This enables application developers to design hierarchical menus, both extended and short menus, in a typical manner without making any changes to their application source code. Alternatively, small-screen computer device manufacturers can configure devices to provide hierarchical menus with ambiguous selection by default, or upon request for application developers. This enables application developers to design hierarchical menus in a typical manner and further allows them to determine if application menus will be implemented as hierarchical menus with ambiguous selection by making a simple selection through their application source code to identify what action should occur in response to an ambiguous selection and populate short menus with preferably those actions, tasks or other commands most commonly used for such displayed page on the screen.

FIGS. 3*j*, 3*k*, 3*m*, 3*n* and 10*a* (discussed later herein) illustrate exemplary embodiments of a computer in the form of various handheld electronic devices that are suitable for implementing embodiments of a hierarchical menu. Additionally, FIGS. 3*b*-3*h*, 3*p* and 3*r* illustrate various keyboard layouts that can be used on such devices.

The computer 300 in the form of a handheld electronic device includes an input portion and an output display portion. The output display portion can be a display screen, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia displayed at their top surface and/or on the surface of the area adjacent the respective key, the particular indicia representing the character(s), command(s) and/or function(s) typically associated with that key. In the instance where the indicia of a key's function is provided adjacent the key, it is understood that this may be a permanent insignia that is, for instance, printed on the device cover beside the key, or in the instance of keys located adjacent the display screen, a current indicia for the key may be temporarily shown nearby the key on the screen.

In the case of software keys, the indicia for the respective keys are shown on the display screen, which in one embodiment is enabled by touching the display screen, for example, with a stylus to generate the character or activate the indicated command or function. Such display screens may include one or more touch interfaces, including a touchscreen. A non-exhaustive list of touchscreens includes, for example, resistive touchscreens, capacitive touchscreens, projected capacitive touchscreens, infrared touchscreens and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device is shown on the display screen in the same configuration as the physical keys. Thus, the desired character, command or function is obtained by depressing the physical key corresponding to the character, command or function displayed at a corresponding position on the display screen, rather than touching the display screen. To aid the user, indicia for the characters, commands and/or functions most frequently used are preferably positioned on the physical keys and/or on the area around or between the physical keys. In this manner, the user can more readily associate the correct physical key with the character, command or function displayed on the display screen.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations of the English-language alphabet.

Figure 3B:
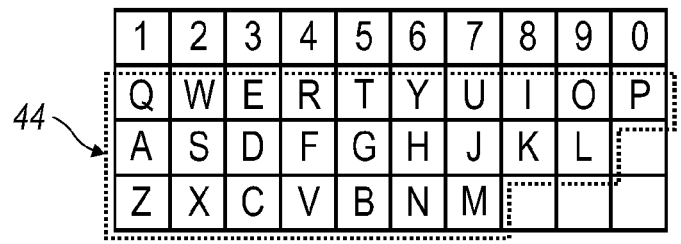
FIG. 3b illustrates an exemplary QWERTY keyboard layout.

The QWERTY keyboard layout is the standard English-language alphabetic key arrangement 44, as shown in FIG. 3*b*. In this configuration, Q, W, E, R, T and Y are the letters on the top left, alphabetic row. It was designed by Christopher Sholes, who invented the typewriter. The keyboard layout was organized by him to prevent people from typing too fast and jamming the keys. The QWERTY layout was included in Sholes U.S. Pat. No. 207,559 as filed in 1875.

Figure 3C:
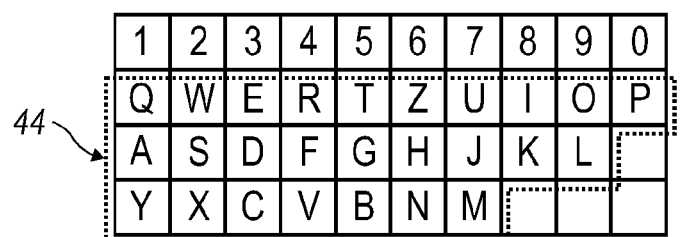
FIG. 3c illustrates an exemplary QWERTZ keyboard layout.

The QWERTZ keyboard layout is normally used in German-speaking regions. This alphabetic key arrangement 44 is shown in FIG. 3*c*. In this configuration, Q, W, E, R, T and Z are the letters on the top left, alphabetic row. It differs from the QWERTY keyboard layout by exchanging the "Y" with a "Z". This is because "Z" is a much more common letter than "Y" in German and the letters "T" and "Z" often appear next to each other in the German language.

Figure 3D:
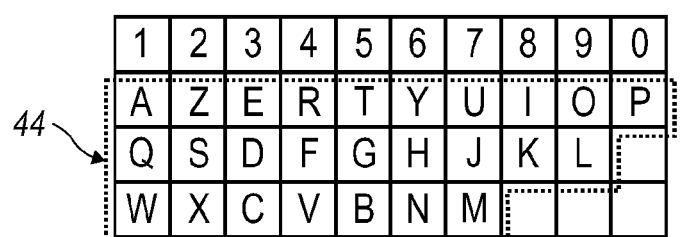
FIG. 3d illustrates an exemplary AZERTY keyboard layout.

The AZERTY keyboard layout is normally used in French-speaking regions. This alphabetic key arrangement 44 is shown in FIG. 3*d*. In this configuration, A, Z, E, R, T and Y are the letters on the top left, alphabetic row. It is similar to the QWERTY layout, except that the letters Q and A are swapped, the letters Z and W are swapped, and the letter M is in the middle row instead of the bottom one.

Figures 3E, 3F, 3G, 3H:
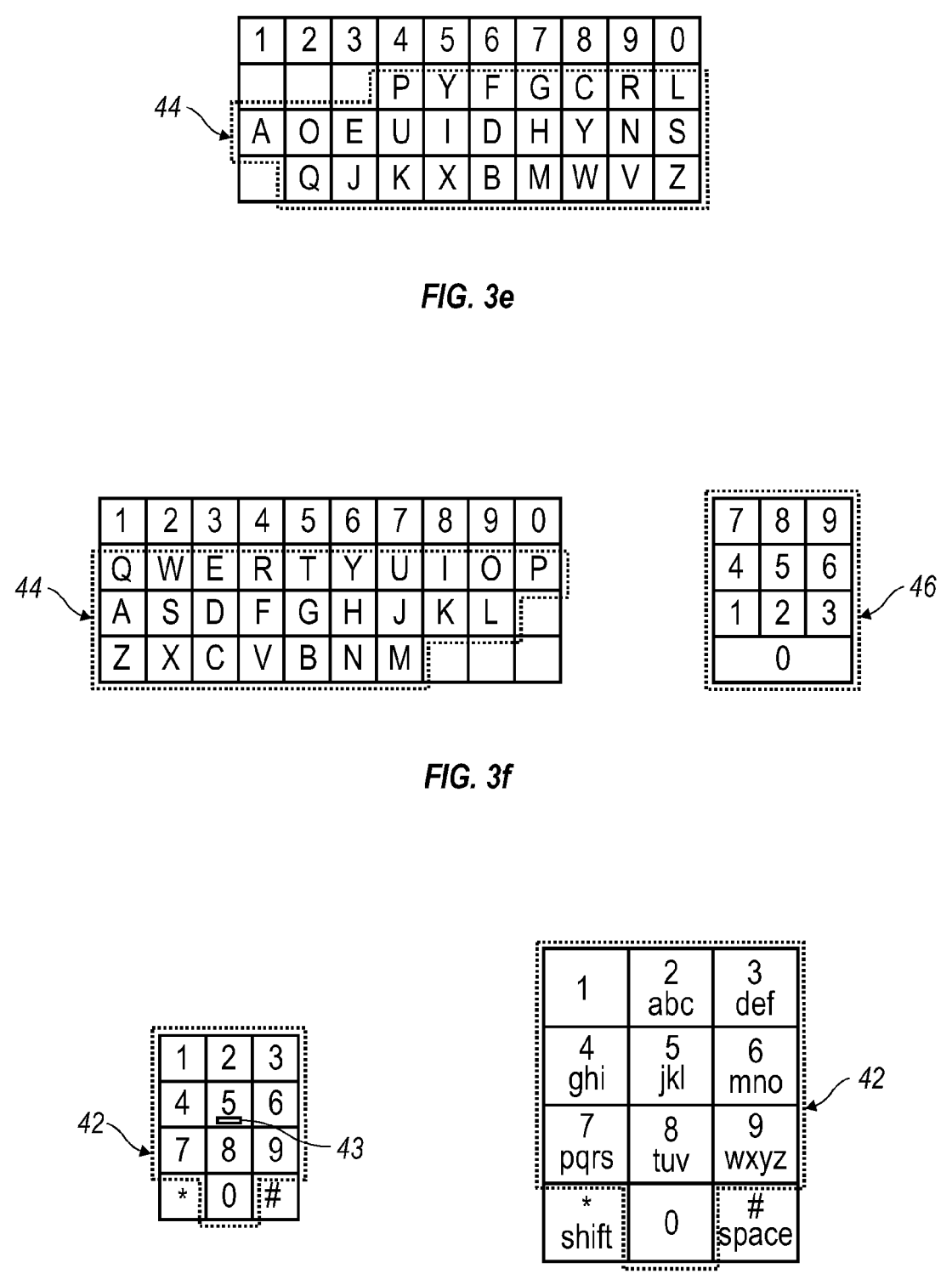

The Dvorak keyboard layout was designed in the 1930s by August Dvorak and William Dealey. This alphabetic key arrangement 44 is shown in FIG. 3*e*. It was developed to allow a typist to type faster. About 70% of words are typed on the home row compared to about 32% with a QWERTY keyboard layout, and more words are typed using both hands. It is said that in eight hours, fingers of a QWERTY typist travel about 16 miles, but only about 1 mile for the Dvorak typist.

Alphabetic key arrangements in full keyboards and typewriters are often presented along with numeric key arrangements. An exemplary numeric key arrangement is shown in FIGS. 3*b*-3*e* where the numbers 1-9 and 0 are positioned above the alphabetic keys. In another numeric key arrangement, numbers share keys with the alphabetic characters, such as the top row of the QWERTY keyboard. Yet another exemplary numeric key arrangement is shown in FIG. 3*f*, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a "ten-key" computer keyboard keypad. Additionally, a numeric phone key arrangement 42 is shown in FIG. 3*g*.

As shown in FIG. 3*g*, the numeric phone key arrangement 42 may also utilize a surface treatment on the surface of the center "5" key. This surface treatment is such that the surface of the key is distinctive from the surface of other keys. Preferably the surface treatment is in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile electronic devices include mobile stations, cellular telephones, wireless personal digital assistants (PDAs), two-way paging devices, and others. Various keyboards are used with such devices depending in part on the physical size of the handheld electronic device. Some of these are termed full keyboard, reduced keyboard, and phone keypads.

In embodiments of a handheld electronic device having a full keyboard, only one alphabetic character is associated with each one of a plurality of physical keys. Thus, with an English-language keyboard, there are at least 26 keys in the plurality, one for each letter of the English alphabet. In such embodiments using the English-language alphabet, one of the keyboard layouts described above is usually employed, and with the QWERTY keyboard layout being the most common.

Figure 3J:
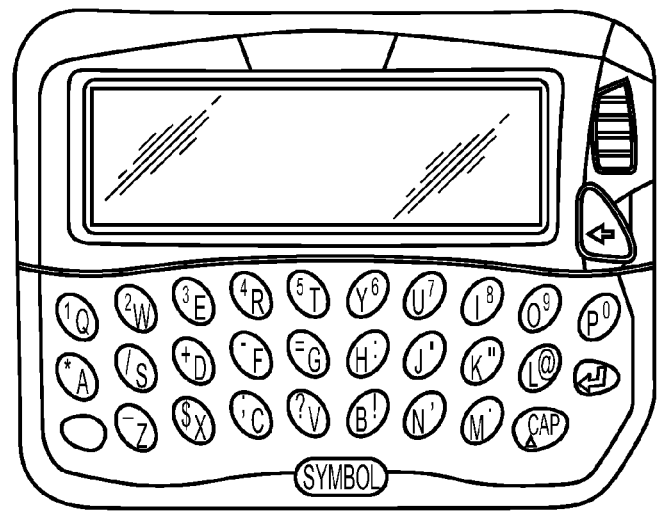
FIG. 3j is a front view of an exemplary handheld electronic device including a full QWERTY keyboard.
Figure 3K:
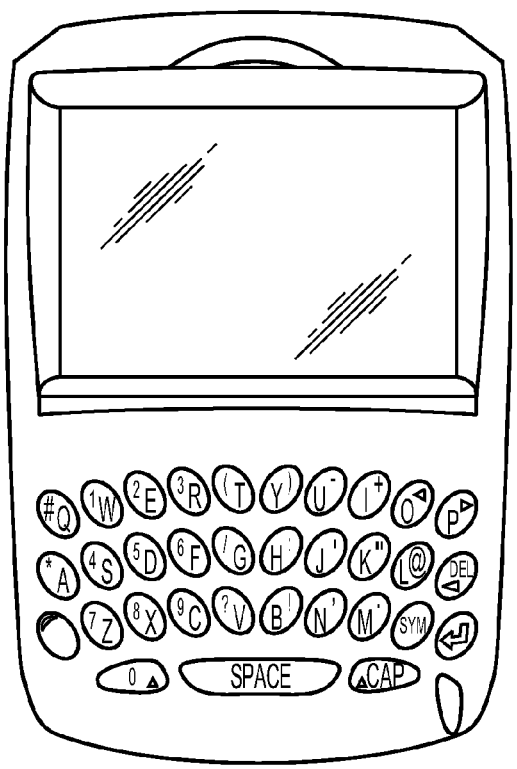
FIG. 3k is a front view of another exemplary handheld electronic device including a full QWERTY keyboard.

One device that uses a full keyboard for alphabetic characters and incorporates a combined numeric keyboard is shown in FIG. 3*j*. In this device, numeric characters share keys with alphabetic characters on the top row of the QWERTY keyboard. Another device that incorporates a combined alphabetic/numeric keyboard is shown in FIG. 3*k*. This device utilizes numeric characters in a numeric phone key arrangement consistent with the ITU Standard E.161, as shown in FIG. 3*g*. The numeric characters share keys with alphabetic characters on the left side of the keyboard.

In order to further reduce the size of a handheld electronic device without making the physical keys or software keys too small, such embodiments of a handheld electronic device use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software is contained in the processor of the handheld electronic device to determine or predict what letter or word was intended by the user. Predictive text technologies can also automatically correct common spelling errors. Predictive text methodologies often include a disambiguation engine and/or a predictive editor application. This helps facilitate easy spelling and composition, since the software is preferably intuitive software with a large word list and the ability to increase that list based on the frequency of word usage. The software preferably also has the ability to recognize character letter sequences that are common to the particular language, such as, in the case of English, words ending in "ing". Such systems can also "learn" the typing style of the user making note of frequently used words to increase the predictive aspect of the software. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

The multi-tap method of character selection has been in use a number of years for permitting users to enter text using a touch screen device or a conventional telephone key pad such as specified under ITU E 1.161, among other devices. Multi-tap requires a user to press a key a varying number of times, generally within a limited period of time, to input a specific letter, thereby spelling the desired words of the message. A related method is the long tap method, where a user depresses the key until the desired character appears on the display out of a rotating series of letters.

A "text on nine keys" type system uses predictive letter patterns to allow a user to ideally press each key representing a letter only once to enter text. Unlike multi-tap which requires a user to indicate a desired character by a precise number of presses of a key, or keystrokes, the "text on nine keys" system uses a predictive text dictionary and established letter patterns for a language to intelligently guess which one of many characters represented by a key that the user intended to enter. The predictive text dictionary is primarily a list of words, acronyms, abbreviations and the like that can be used in the composition of text. Generally, all possible character string permutations represented by a number of keystrokes entered by a user are compared to the words in the predictive text dictionary and a subset of the permutations is shown to the user to allow selection of the intended character string. The permutations are generally sorted by likelihood of occurrence which is determined from the number of words matched in the predictive text dictionary and various metrics maintained for these words. Where the possible character string permutations do not match any words in the predictive text dictionary, the set of established letter patterns for a selected language can be applied to suggest the most likely character string permutations, and then require the user to input a number of additional keystrokes in order to enter the desired word.

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

Figure 3M:
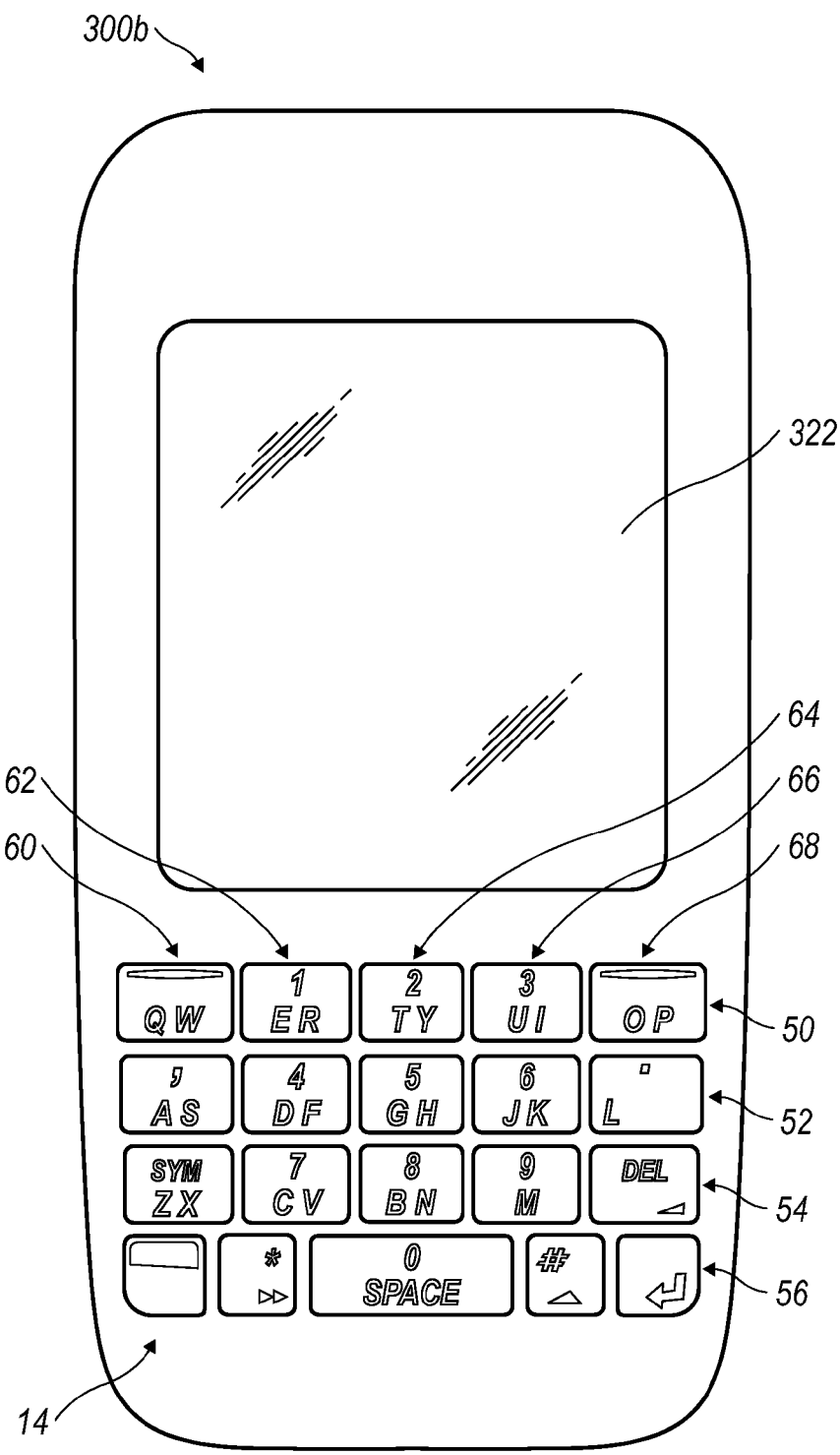
FIG. 3m is a front view of an exemplary handheld electronic device including a reduced QWERTY keyboard.

FIG. 3m shows a handheld electronic device 300b that has an example of a reduced keyboard using the QWERTY keyboard layout on a physical keyboard array of twenty keys, with five columns and four rows. Fourteen keys are used for alphabetic characters and ten keys are used for numbers. Nine of the ten numbers share a key with alphabetic characters. The "space" key and the number "0" share the same key, which is centered on the handheld electronic device 300b and centered below the remainder of the numbers on the keyboard 14. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the handheld electronic device 300b.

Figure 3N:
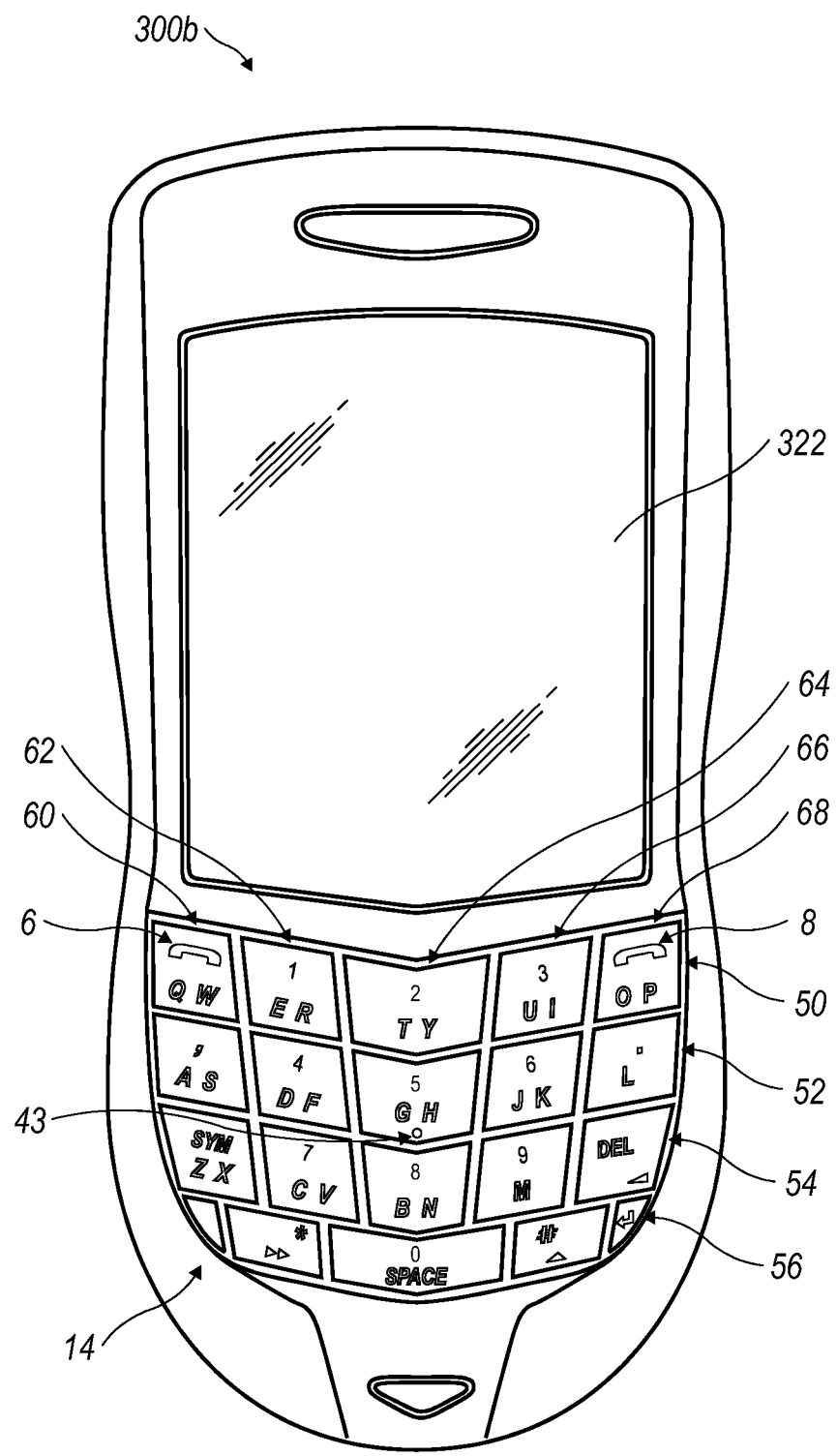
FIG. 3n is an elevational view of the front face of another exemplary handheld electronic device including a reduced QWERTY keyboard.
Figure 3R:
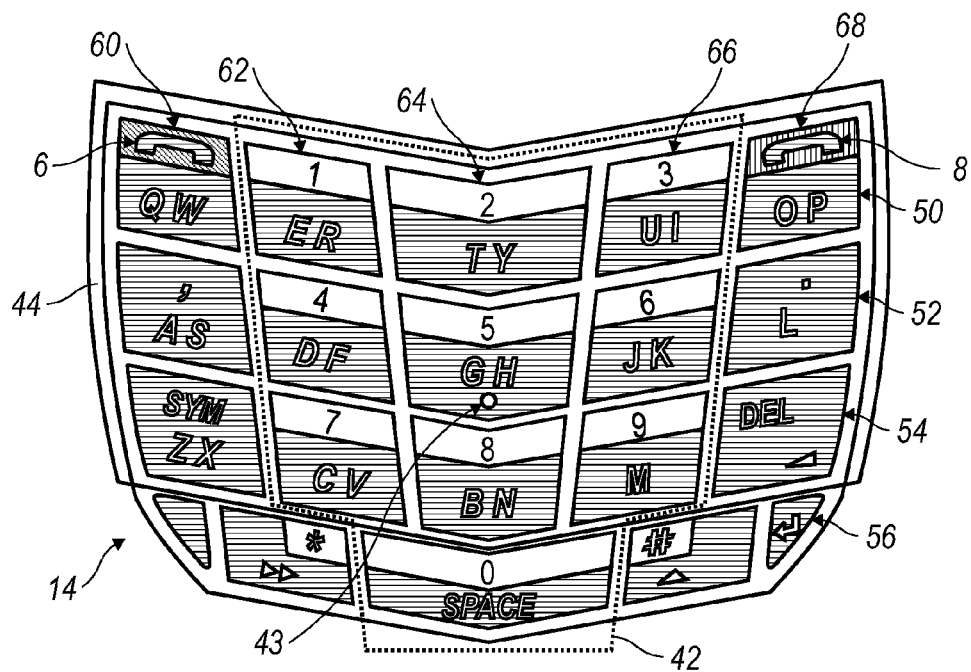
FIG. 3r is a detail view of the reduced QWERTY keyboard of device of FIG. 3n.

FIG. 3n shows a handheld electronic device 300b that has an exemplary physical keyboard array of 20 keys, with five columns and four rows. An exploded view of the keyboard is presented in FIG. 3r. Fourteen keys on the keyboard 14 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement. In this example, the color scheme of the numeric phone keys has a two-tone appearance, with the upper portion of the numeric keys being a first color and the lower portion of the numeric keys being a second color. As depicted, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 14 includes a "send" key 6 and an "end" key 8. The "send" key 6 is positioned in the upper left corner of the keyboard 14 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

Figure 3P:
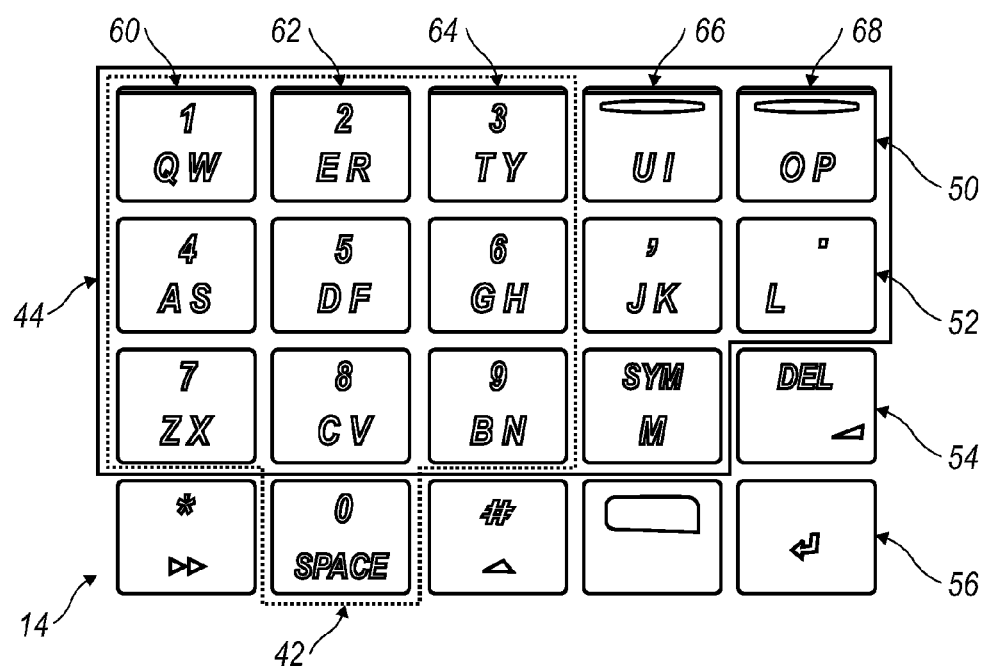
FIG. 3p is a detail view of an alternative reduced QWERTY keyboard.

FIG. 3p shows a similar format for the reduced QWERTY arrangement of alphabetic characters 44 as presented in FIG. 3m, but the numeric phone key arrangement 42 is positioned in the first 60, second 62, and third 64 columns instead of being centered on the keyboard 14. The first row 50 of keys includes in order the following key combinations for the text entry and telephony mode: "QW/1", "ER/2", "TY/3", "UI", and "OP". The second row 52 includes the following key combinations in order: "AS/4", "DF/51", "GH/6", "JK/,", and "L/.". The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 3h. Such alphanumeric phone keypads are used in many, if not most, traditional handheld telephony mobile electronic devices such as cellular handsets. As described above, the International Telecommunications Union ("ITU") has established phone standards for the arrangement of alphanumeric keys. The standard phone numeric key arrangement shown in FIG. 3g (no alphabetic letters) and 3h (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

The table below identifies the alphabetic characters associated with each number for some other phone keypad conventions.

| | | | Mobile Phone Keypad | | |
| --- | --- | --- | --- | --- | --- |
| Number on Key | ITU E.161 | Australia | #1 | #11 (Europe) | #111 (Europe) |
| 1 | | QZ | | ABC | ABC |
| 2 | ABC | ABC | ABC | DEF | DEF |
| 3 | DEF | DEF | DEF | GHI | GHI |
| 4 | GHI | GHI | GHI | JKL | JKL |
| 5 | JKL | JKL | JKL | MNO | MNO |
| 6 | MNO | MNO | MN | PQR | PQR |
| 7 | PQRS | PRS | PRS | STU | STU |
| 8 | TUV | TUV | TUV | ÛVW | VWX |
| 9 | WXYZ | WXY | WXY | XYZ | YZ |
| 0 | | | OQZ | | |

It should also be appreciated that other alphabetic character and number combinations can be used beyond those identified above when deemed useful to a particular application.

As noted earlier, multi-tap software has been in use for a number of years permitting users to enter text using a conventional telephone keypad such as specified under ITU E 1.161 or on a touch screen display, among other devices. Multi-tap requires a user to press a key a varying number of times, generally within a limited period of time, to input a specific letter associated with the particular key, thereby spelling the desired words of the message. A related method is the long tap method, where a user depresses the key until the desired character appears on the display.

Referring to FIGS. 6a-6g, 7, 10a and 10b, the following is a discussion and comparison of the use of the extended and short menus in an embodiment of a handheld electronic device 300b.

In this embodiment, the device 300b has a first input controller, which is preferably a navigation tool 120 having a depressible rolling member or trackball 121, which is used to access the short menu. The handheld device 300b also has a second input controller, which in this case is a menu key 606, which is used to access the applicable extended menu. These menus are based on the interface principle of see and click. In this manner, users do not have to remember commands or options because they can view these options at any time.

Figure 6A:
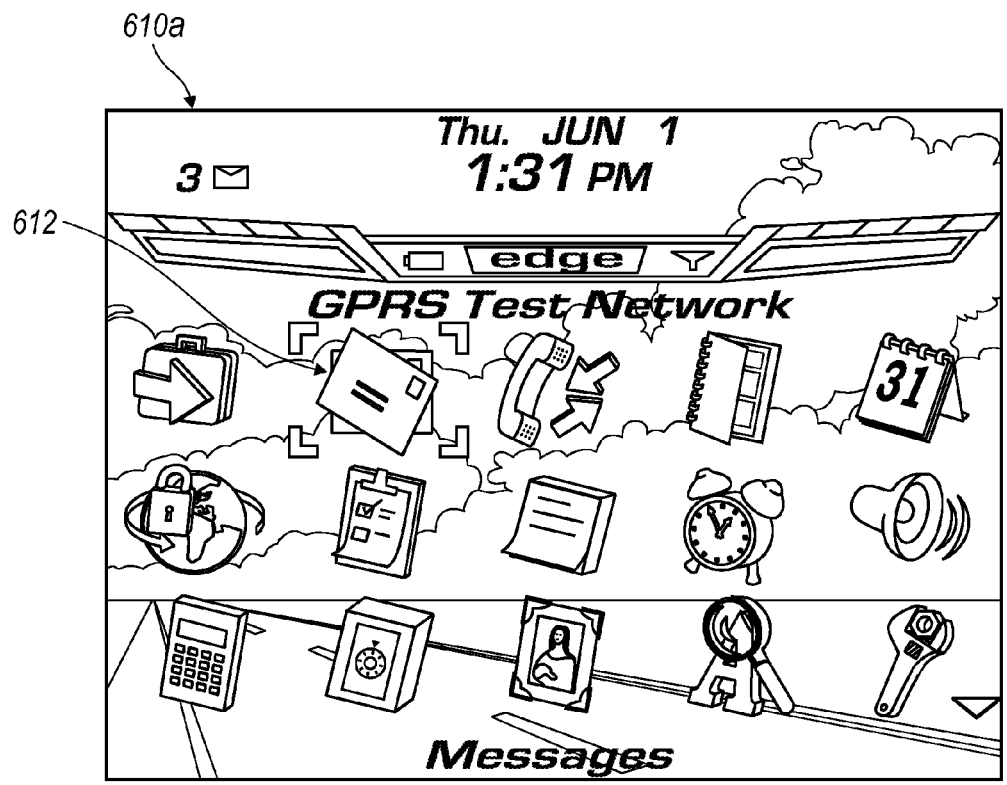
FIGS. 6a-6g illustrate an embodiment of a hierarchical menu implemented on a computer such as a handheld electronic device.
Figure 6B:
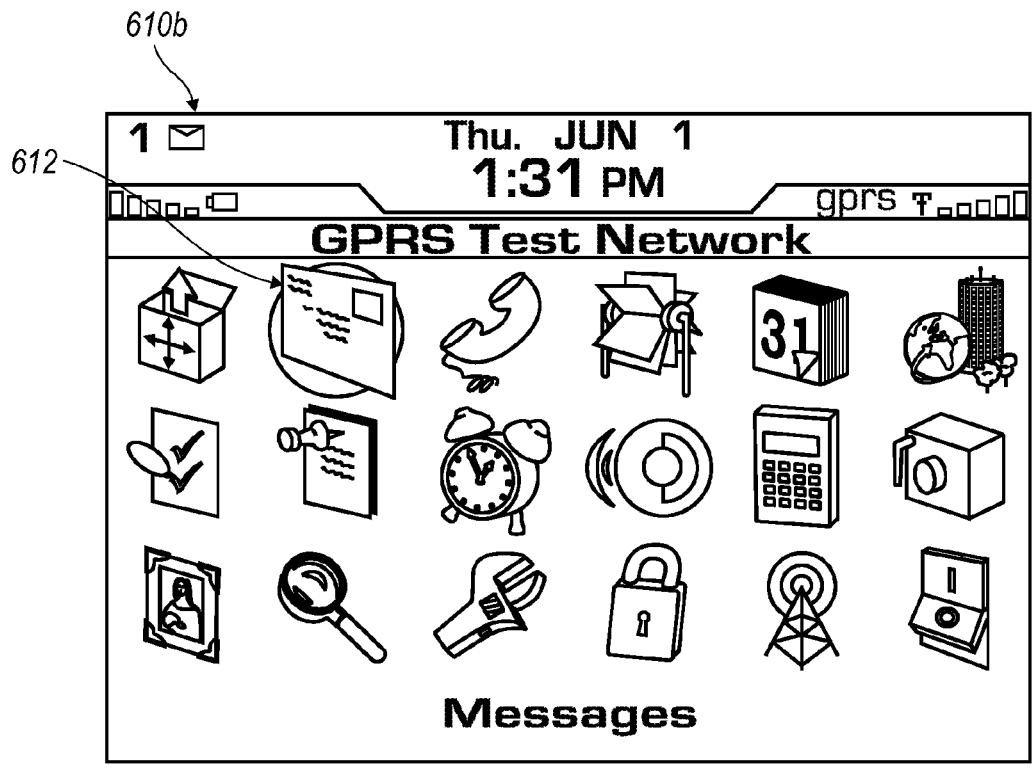
Figure 6C:
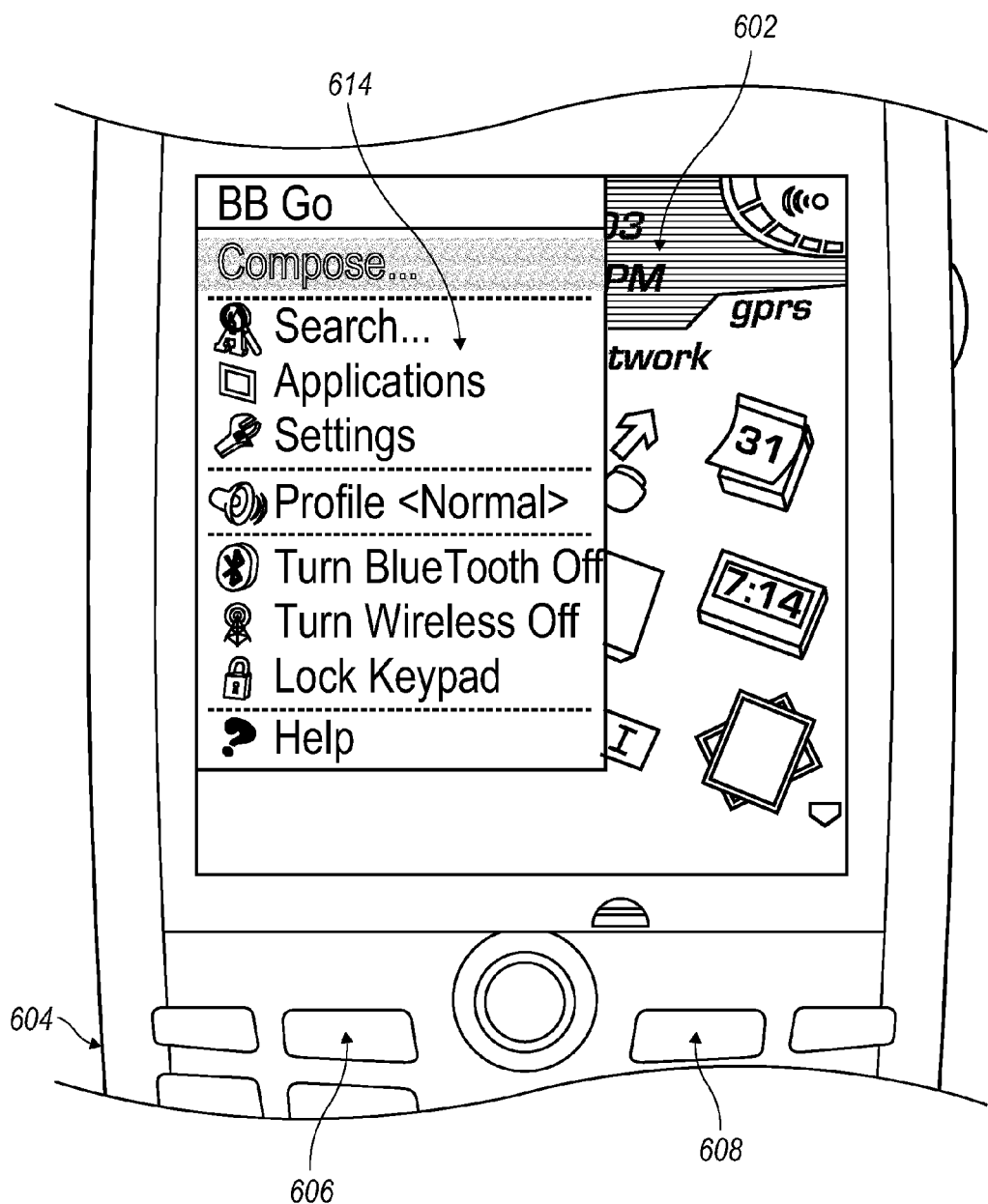

Referring now to FIG. 6c, there is shown a portion of the device 300b, which depicts a display portion 602, and a part of an input portion 604. The display portion 602 is used as a graphical user interface, sometimes referred to herein a GUI or just UI for user interface. The trackball 121 and the menu key 606 are part of the input portion 604. To the right of the trackball 121 is a back key 608, which is used to back-up through previous screens or menus displayed on the display portion. The input portion also includes a keyboard (See FIGS. 10a and 10b), which is discussed later herein.

The initial screen for the device 300b is a home screen 610a and 610b. Two examples 610a and 610b are shown in FIGS. 6a and 6b, which show different sets of icons representing various applications that are available on the device 300b. The user can perform desired high-level activities from the home screen, and within an application explore and access functionality of the selected application.

The menu key or button 606 is to the left of the trackball 121 and activates an extended menu, which contains high level actions desirable from the home screen or application specific commands when initiated from a selected application. The menu key or button 606 provides a consistent location where the user can look for commands. Each application has its own extended menu consisting of application-specific menus.

Clicking (depressing) the trackball 121 when an icon on the home screen is highlighted opens the application, preferably to a common page used by users. For example, if the email message's icon is highlighted, then a page listing the messages will open. When not on the home screen but while a page of an application is displayed without a menu showing, if the trackball 121 is clicked, this is presently referred to as an ambiguous selection, since several commands may apply in that circumstance. This ambiguous selection will cause a short menu to appear on the GUI. The short menu contains a list of menu items that are preferably the most commonly used commands in the present screen context. These short menus again are based on the interface principle of see and click. The options or menus change according to the task at hand.

The items shown in these short menus preferably are those that a user performs frequently. In other embodiments, the short menu is selected based on either predefined user or programmer preference. These short menus are preferably correctly organized, worded clearly, and behave correctly in order for the user to understand what options they should expect to see, and how to access the additional functionality specific to the selected application.

In at least one embodiment, the items displayed in the short menu are dynamically updated depending upon the user's selection of items from the extended menu. When items are selected from the extended menu repeatedly they are ranked and depending upon their number of selections will relatively appear in the short menu. The number of items in the short menu is preferably between two and ten items. The items displayed in the short menu can also be user selected in one embodiment.

In another embodiment, the information for the short menu is stored locally as well as at a central location. The transmission of the short menus that are applicable for the particular user is via a communication system as described below. The information stored at the central location allows the user to access that information on multiple devices. This will allow the user to experience identical menus on different devices. This is helpful when a user would like to encounter the same interface, but uses the devices in different ways. The information alternatively may be stored on a memory card and transferred between devices via the memory card.

For purposes of example, in the following disclosure, the use of the menus, trackball and keys are discussed relative to the use of an email message application.

Initially, the user uses the trackball 121 to scroll to the desired application. In this case, it is the email messaging application. In FIGS. 6a and 6b, the email icon 612 (a letter envelope) is highlighted in a conventional manner, for example, with a frame as shown in FIG. 6a or with a highlighted background as depicted in FIG. 6b. Then, the menu key 606 is activated by depressing or "clicking" it, which brings up a high level extended menu 614 as shown in FIG. 6c. This menu 614 can include the following menu items:

---

Compose . . .
---------------
Search . . .
Applications
Settings
---------------
Profile < Normal >
---------------
BlueTooth On/Off
Wireless On/Off
Key Lock On/Off
---------------
Help

---

For example, clicking on "Compose" would initiate the address book function and allow the user to select an addressee, select the type of message (email, SMS, IM, etc.) and proceed with the composition of a message. However, for the present example, the user desires to open their email message mailbox and view a list of email messages. In another embodiment, the menu includes the option "close," which will close the menu. Preferably, the option to close the menu is listed near the bottom. This enables closing of the menu without requiring the use of an additional key to close the menu.

Figure 6D:
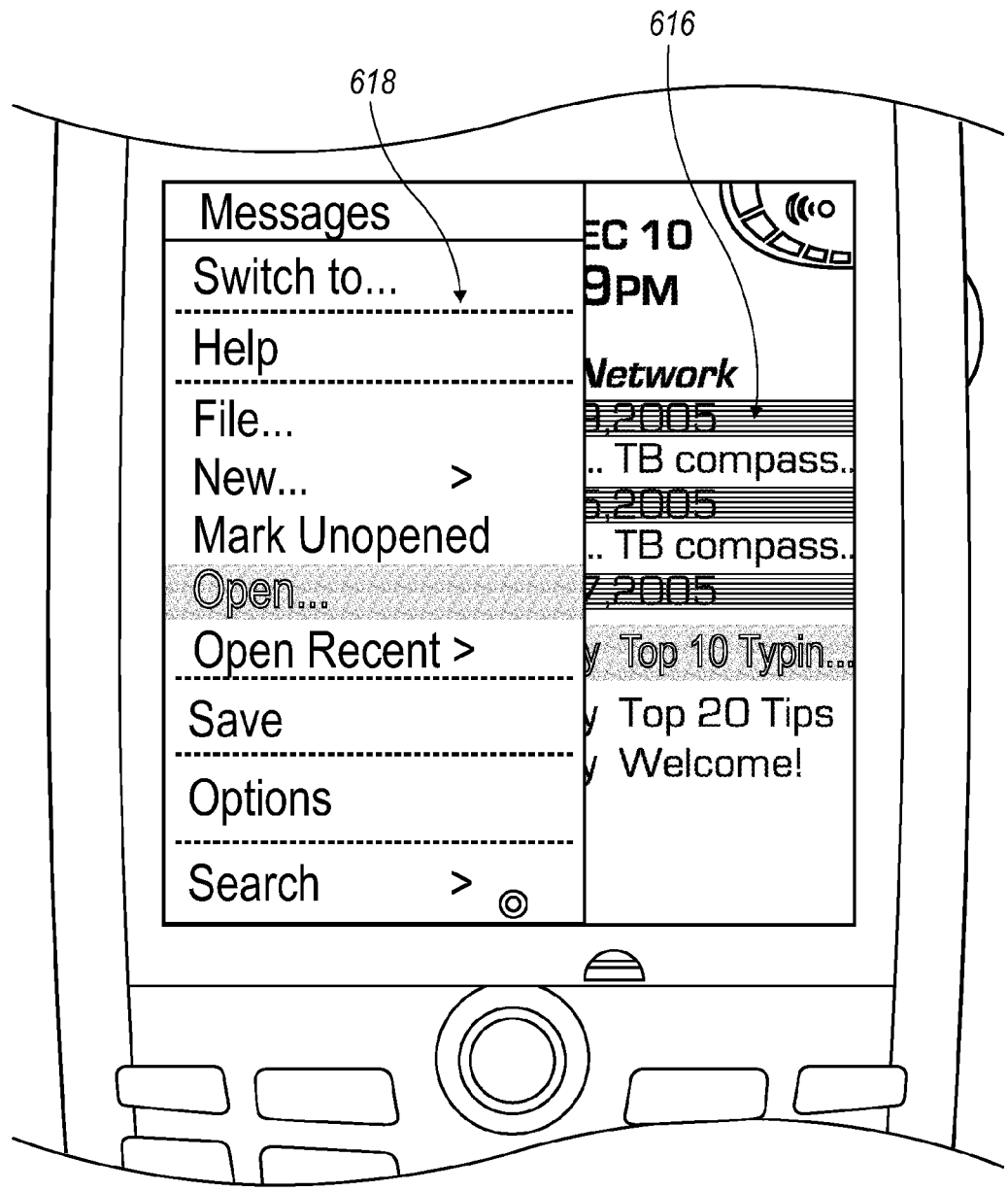
Figure 6E:
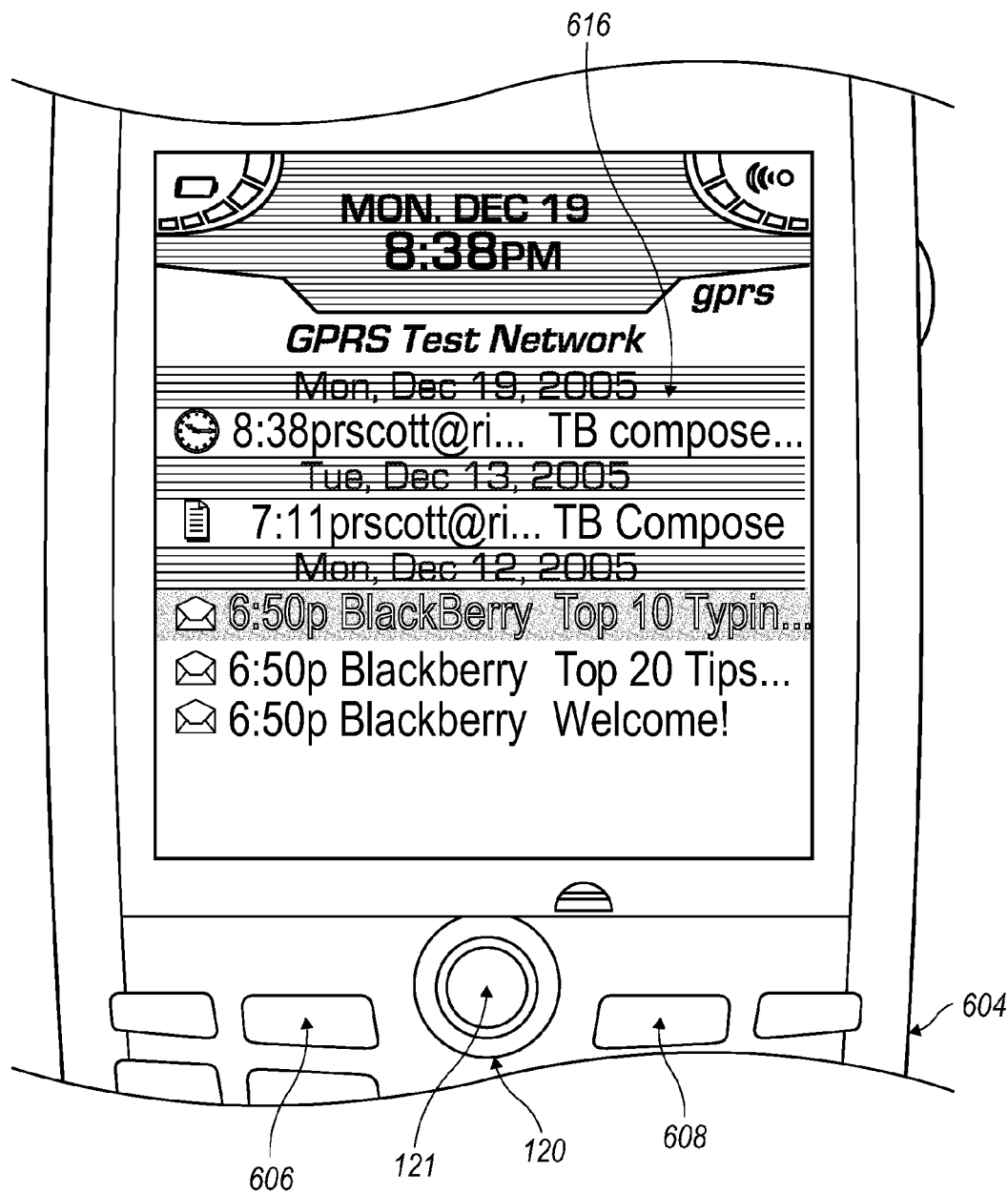

To do this, the menu key 606 is clicked again and the extended menu for the email messaging application is displayed, as shown in FIG. 6d. If the menu item "Open" is not already highlighted, then the trackball 121 is used to scroll to this item such that it is highlighted. Once the menu item "Open" is highlighted, the trackball 121 is clicked. A list of email messages 616 is displayed on the GUI as shown in FIG. 6e.

Figure 6F:
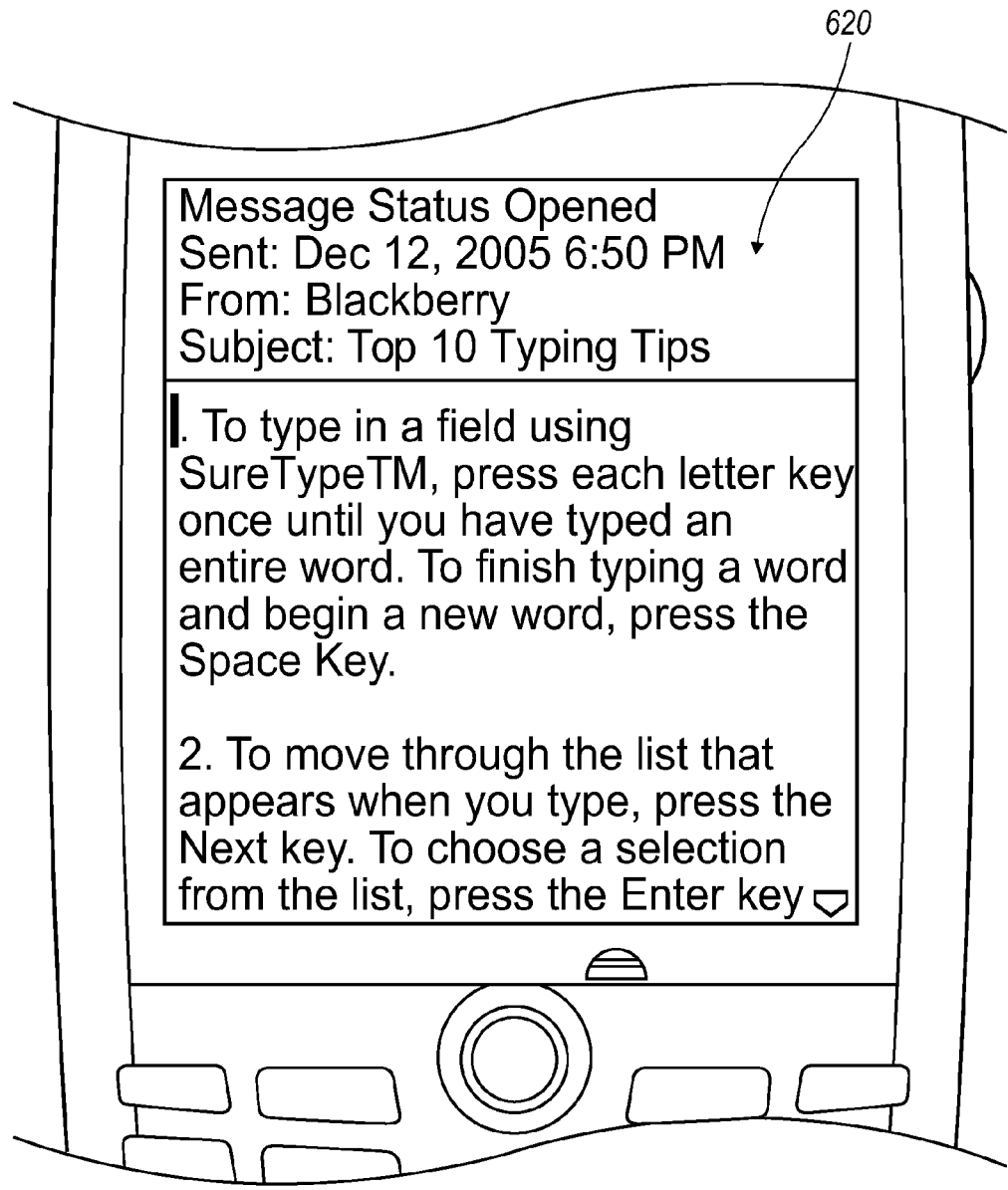

In order to open and read a particular email message, the trackball 121 is then used to scroll to the desired email message in the displayed list to highlight it. The menu key 606 is clicked and the extended menu 618 is displayed, for example as shown in FIG. 6d. If the menu item "Open" is not already highlighted, then the trackball 121 is used to scroll to this item such that it is highlighted. Once the menu item "Open" is highlighted, the trackball 121 is clicked. The desired message 620 is displayed on the GUI as shown in FIG. 6f.

Figure 6G:
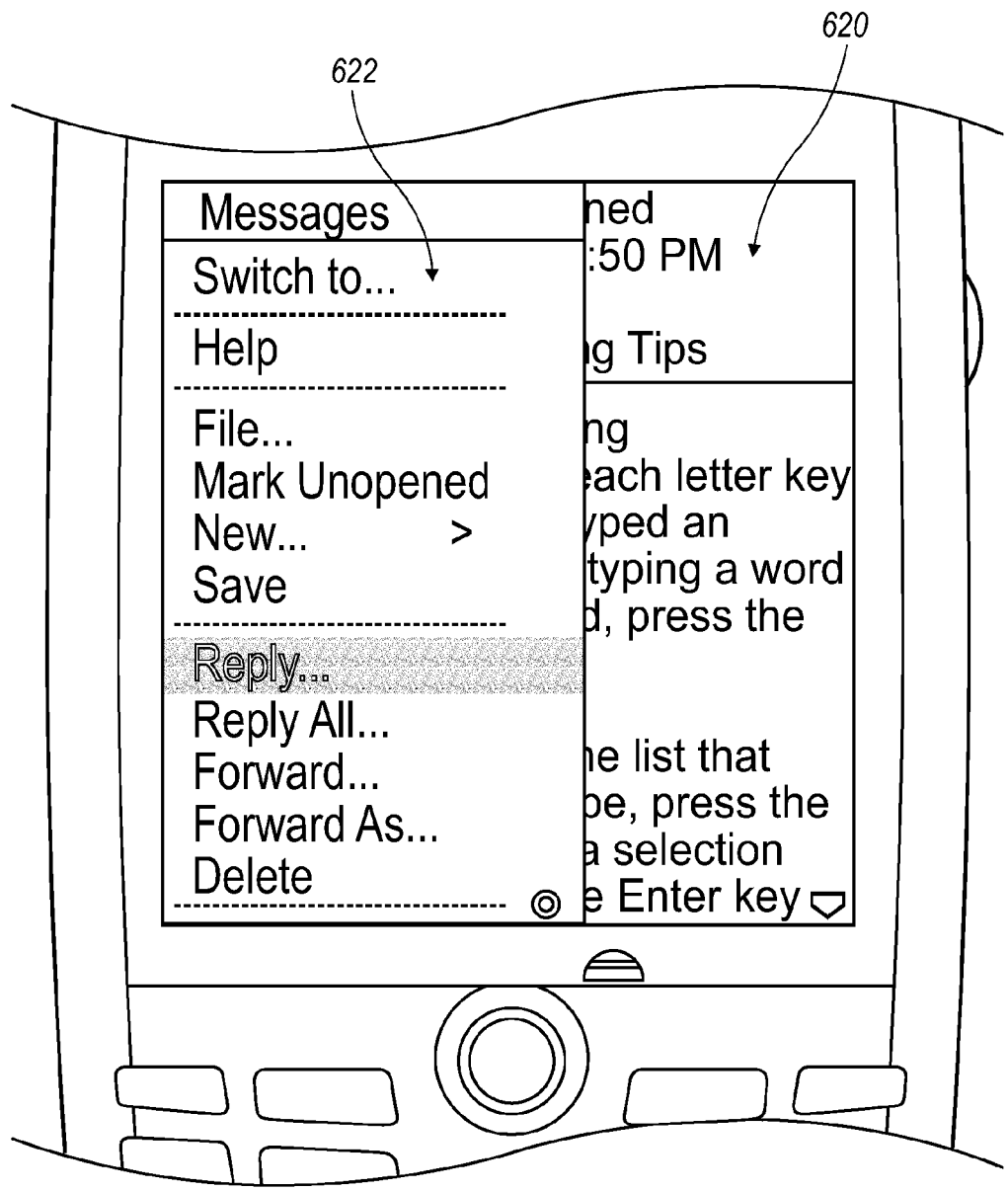

The user then decides what to do as a result of reading the message. To perform the next action, the user clicks the menu key 606 and another extended menu 622 appears, as shown in FIG. 6g. If not already highlighted, the user then scrolls to the desired menu item using the trackball 121 until the desired menu item (action or task) is highlighted. Then, the user clicks the trackball 121 to activate the desired action or task.

The use of the short menu usually requires fewer clicks to perform the same action as compared to the use of solely the extended menus. For example, the following is an embodiment using the ambiguous selections and/or short menus to open the email messaging application and to open a particular email message.

Starting from the home screen or menu 602, the trackball 121 is used to scroll to and highlight the email message icon 612 as shown in FIGS. 6*a* and 6*b*. Clicking the trackball 121 directly opens the list of messages as shown in FIG. 6*e*. The trackball 121 is clicked while no menu is present and this action is an ambiguous selection since more than one action or task is possible. This ambiguous selection while on the home screen 602 and with the email icon 612 highlighted is treated by the menu program and system as a direction or command to open the highlighted application. In this embodiment, it is believed that the user is attempting to perform the task of opening the email application program and the menu program is programmed accordingly. Displaying the list of emails, 616 is the action or task is believed to be the most common desired task or action, and thus to the user, the procedure appears intuitive. Such ambiguous selection for other application is preferably programmed with the most common desired task or action for the selected application.

In this regard, it is appreciated that to open the email message list took two clicks and one scrolling using the extended menus, whereas with the ambiguous selection routine of the menu program, this was reduced to just a single click.

Now, with the email message list 616 on the display, the user scrolls to the desired email message, clicks with the trackball 121, and the desired email message 620 is displayed on the screen 110 (See FIG. 10*a*), as shown in FIG. 6*f*. Again, there is no menu on the display 110 and the action is an ambiguous selection since more than one action or task is possible.

In this regard, it is also appreciated that to open a desired email message took two clicks and possibly a scroll, whereas with the ambiguous selection routine of the menu program, this was reduced to just a single click.

Figure 7:
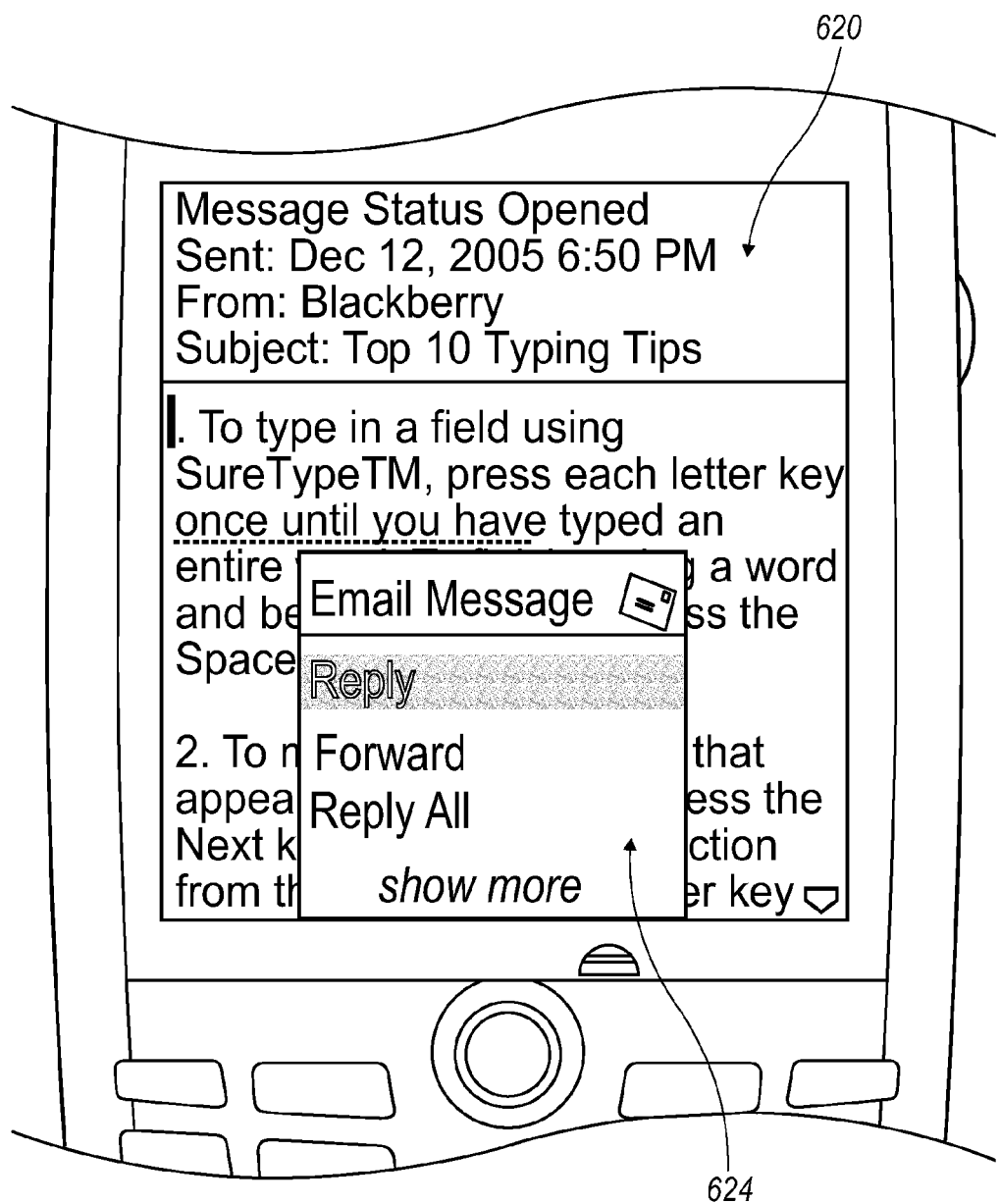
FIG. 7 illustrates an embodiment of a hierarchical menu (short menu) implemented on a computer such as a handheld electronic device.

While the user is viewing the message 620 on the GUI display 110 after having read its contents, the user clicks the trackball 121 making another ambiguous selection, again since no menu is on display 110 and more than one action or task is possible. This ambiguous selection causes the menu program to display a short menu 624, preferably of menu item corresponding to actions or tasks commonly performed by users at that point. In this embodiment, a short menu 624 is shown in FIG. 7, and contains the actions or tasks—"Reply", "Forward" and "Reply All." The user then decides which action or task to perform and scrolls to it and clicks the trackball. Novice and experienced users alike benefit from the reduction in information displayed on the menu through the removal of less commonly used tasks. The short menu 624 as shown in FIG. 7 contains a title "Email Message," thus providing information about the application that is associated with the menu. Likewise, other titles for other menus would be appropriate at times when menus are displayed in connection with other applications. In other embodiments, the short menu features the menu item "close" in addition to those items described above.

Thus, the short menu provides convenient access to the high level, most often-used commands associated with an application. The short menu displayed can also depend on the position of the cursor within the displayed page. The short menu can be considered as a shortcut to commands that make sense to the task at hand. In some cases when on the home screen, rather than opening the indicated application, a short menu can be displayed with the more common subset of actions, tasks or other commands by making an ambiguous selection by clicking on a highlighted application icon on the home screen.

If the desired action or task is not listed on the short menu, the user can click the menu key 606 to view the extended menu, such as shown in FIG. 6*g* using the exemplary email messaging scenario. Alternatively, the short menu 624 can have a menu item that allows the user to scroll to and select the item as shown in FIG. 6*g*. Once that menu item has been selected then the extended menu replaces the short menu. For example, the short menu in FIG. 7 has a menu item "show more" for this purpose. The name of this menu item can be any other that conveys a similar meaning, such a "Full" or "Extended" or an icon that is used by the device provider and identified in its literature to have that meaning. Likewise, the menu key 606 in a preferred embodiment features an icon or the like that is shown next to the "show more" menu item.

It is also noted that commands for various tasks can also be input via the keyboard by typing them and entering it. More experienced users may use this feature to further reduce number of keystrokes in some situations.

Other applications of short menus are possible as well. Another example of the use of a short menu is when the device features soft keys, which can be user customizable. Since these softkeys are user customizable, a short menu can be activated when the soft key is activated two times without any additional user input and/or within a predefined time. The short menu would present options to change the soft key to bring up different program options. The short menu likewise could feature the extended menu features and close options mentioned above.

Example methods for implementing an embodiment of a hierarchical menu and ambiguous selection will now be described with primary reference to the flow diagram of FIG. 8. The methods apply generally to the exemplary embodiments discussed above with respect to FIGS. 6*a*-6*g* and 7. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), a portable compact disc read-only memory (CDROM) (optical), and a solid state storage device (magnetic; e.g., flash memory).

Figure 8:
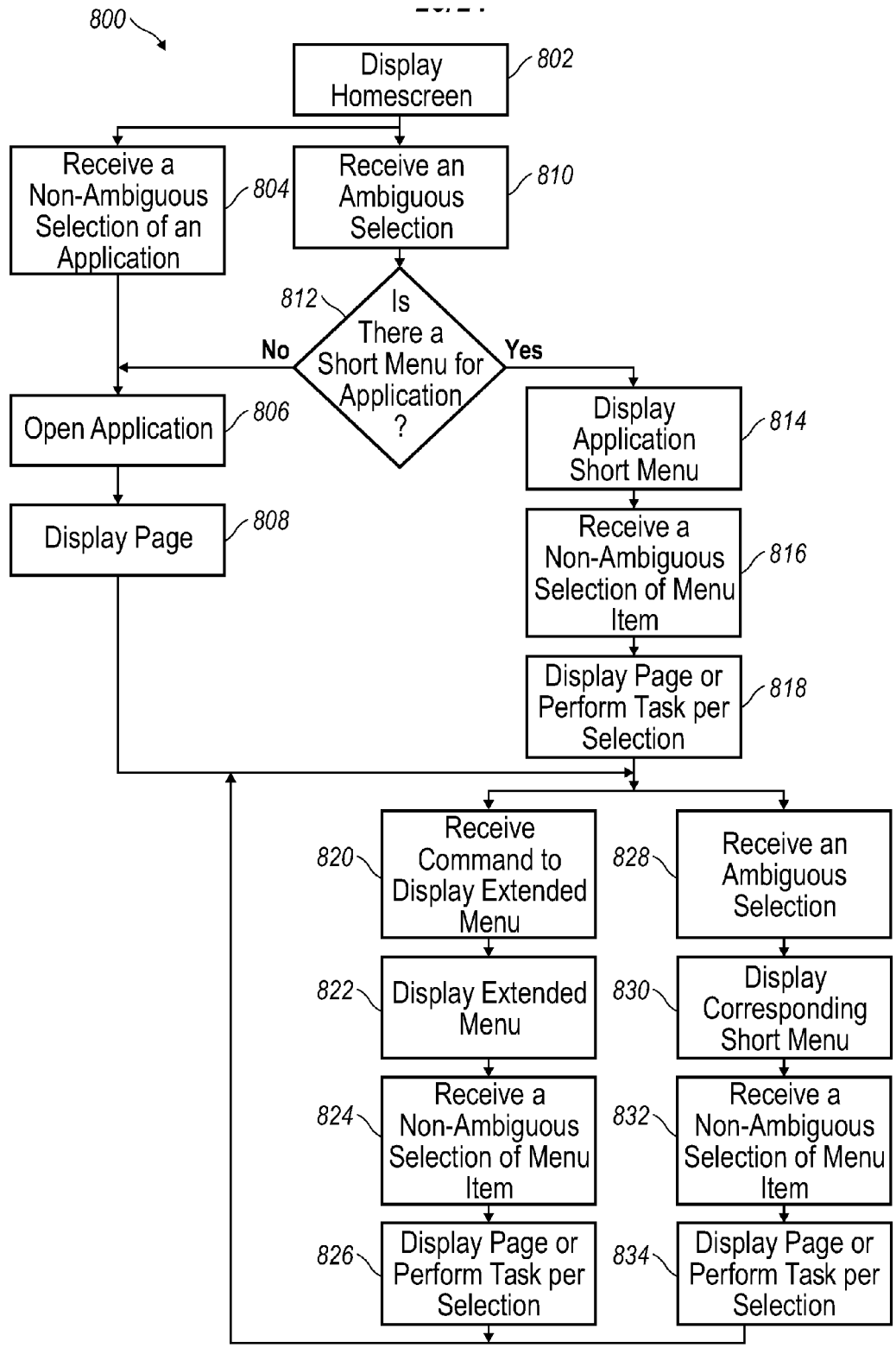
FIG. 8 illustrates an embodiment of a method for implementing a hierarchical menu with ambiguous selection on a computer device such as a handheld electronic device, for example, a PDA or other similar device having a small display screen.

FIG. 8 illustrates an exemplary method 800 for implementing a hierarchical menu with ambiguous selection on a computer device 300 such as a PDA 300*a* or other similar device having a small display screen. The method 800 describes a hierarchical menu process that could continue well beyond the number of submenus that are discussed in the method itself. Thus, the extent of method 800 is not intended as a limitation. Rather, the extent of method 800 is intended to generally express the manner by which a hierarchical menu with ambiguous selection can be implemented in lesser and greater degrees of size and complexity.

Initially, there is displayed a home screen 802 on the GUI. The user scrolls to a particular application using a navigation tool. The user can then depress the menu key to initiate a non-ambiguous selection 804 of that particular application that is received by the method 800. The method 800 then causes the selected application to open an application 806 and display a page 808 on the GUI. Alternatively, the user can make an ambiguous selection 810, for example, if the navigation tool is a trackball having a depressible rolling member, the user depresses the rolling member when no menu is present. The method 800 receives the ambiguous selection 810 and then must determine whether there is a short menu for this application 812. If there is no short menu, then the method 800 causes the application to open 806 and display a page 808. If there is a short menu, then the method causes the display of the application short menu 814. The user then scrolls to the desired menu item and depresses the rolling member. The method 800 receives a non-ambiguous selection of the menu item 816 and either displays a page or causes the computer to perform the task selected 818.

Once a page is displayed 808 or 818, the user again has two choices. The user can depress the menu key and the method 800 receives a command to display an extended menu 820 corresponding to the displayed page. The method 800 then displays that extended menu 822. The user then scrolls to a particular menu item and depresses the rolling member, which causes the method 800 to receive a non-ambiguous selection of a menu item 824. The method 800 then displays a page or performs the task per the selection 826. Alternatively, the user can depress the rolling member with no menu displayed causing an ambiguous selection 828. The method 800 receives this ambiguous selection 828 and causes the display of a corresponding short menu 830, or the method 800 can be programmed to perform a particular task that is the most common for the displayed page (not shown in FIG. 8). With the short menu displayed, the user can then scroll to the desired menu item and depress the rolling member to generate a non-ambiguous selection 832. The method 800 receives the non-ambiguous selection of the menu item 832 and causes the display of a page or performance of a task per the selection 834.

If the user is presented with another displayed page, the user can repeat steps 820 through 826 or 828 through 834, depending on whether the user uses an extended menu or short menu, respectively.

Once the particular activity is completed, the user can use the back key to navigate back through the various pages displayed until the user reaches a page from which the user can perform another activity or select another application upon reaching the home screen 802. The computer can be equipped with an escape key to go to the home screen 802 directly. Alternatively, an ambiguous selection to display a short menu or a non-ambiguous selection can be made to display a short or extended menu that has a home screen menu item.

Figure 9:
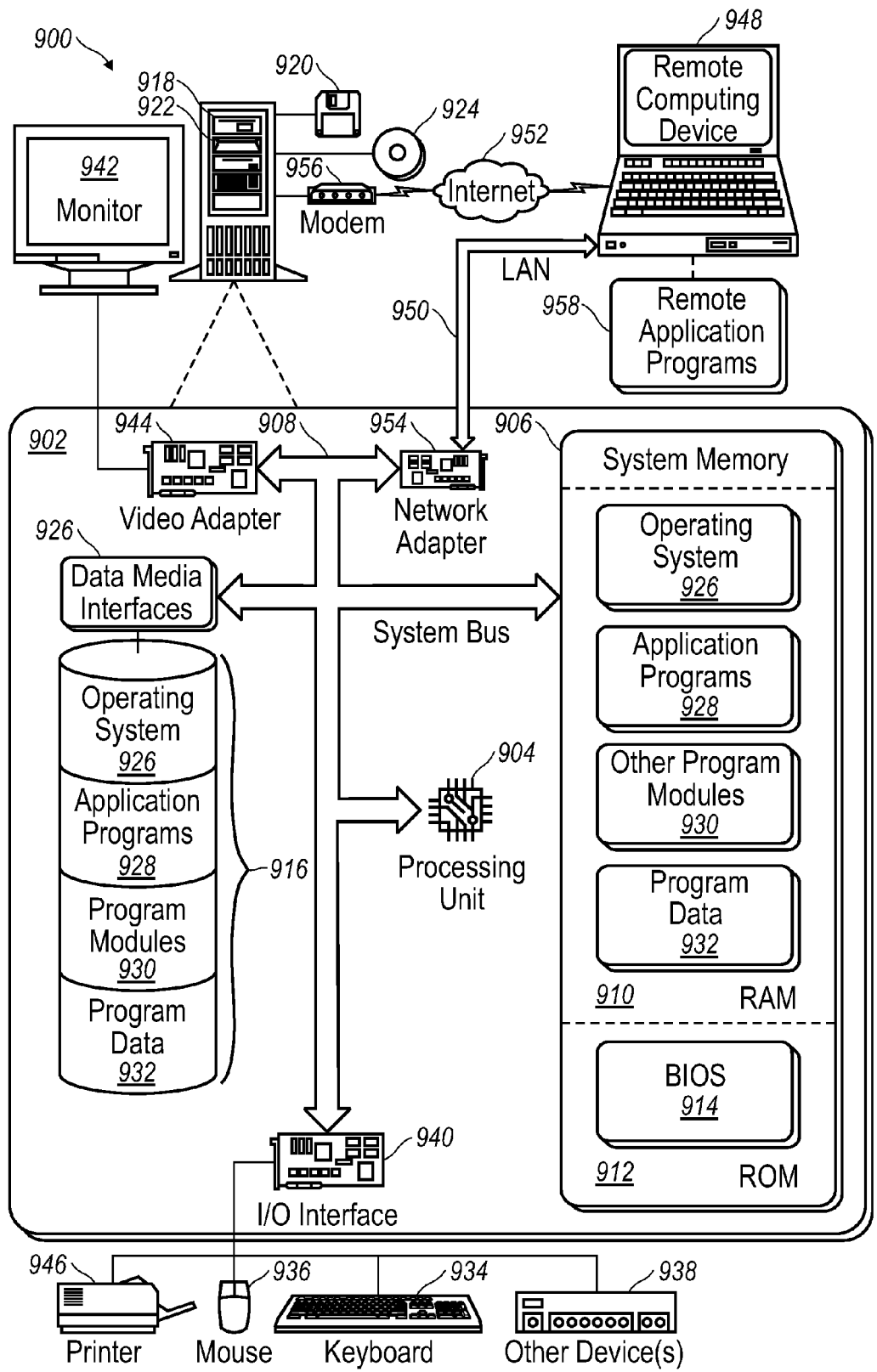
FIG. 9 illustrates an embodiment of a computing environment suitable for implementing an exemplary computer as shown in FIG. 3.

FIG. 9 illustrates an exemplary computing environment suitable for implementing a computer 300 such as discussed above with reference to FIGS. 1-8 and 10. Although one specific configuration is shown in FIG. 9, computer 300 may be implemented in other computing configurations.

The computing environment 900 includes a general-purpose computing system in the form of a computer 902. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. An example of a system bus 908 would be a Peripheral Component Interconnects (PCI) bus, also known as a Mezzanine bus.

Computer 902 typically includes a variety of computer-readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by a known interface (not shown) including but not limited to SCSI and IDE.

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a caching scheme for user network access information.

Computer 902 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

Figure 10A:
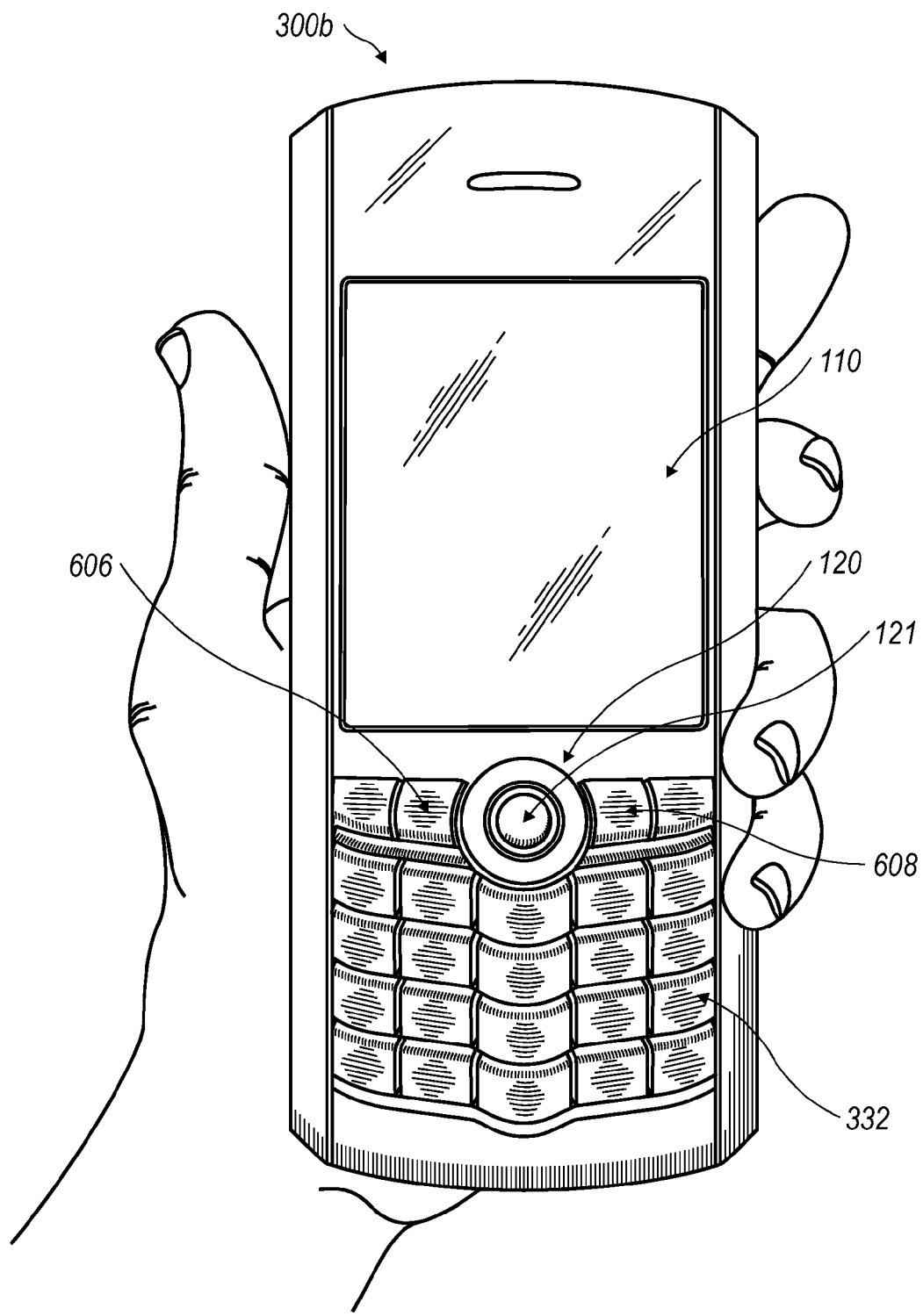
FIG. 10a is a perspective view of a handheld electronic device cradled in a user's hand.
Figure 11:
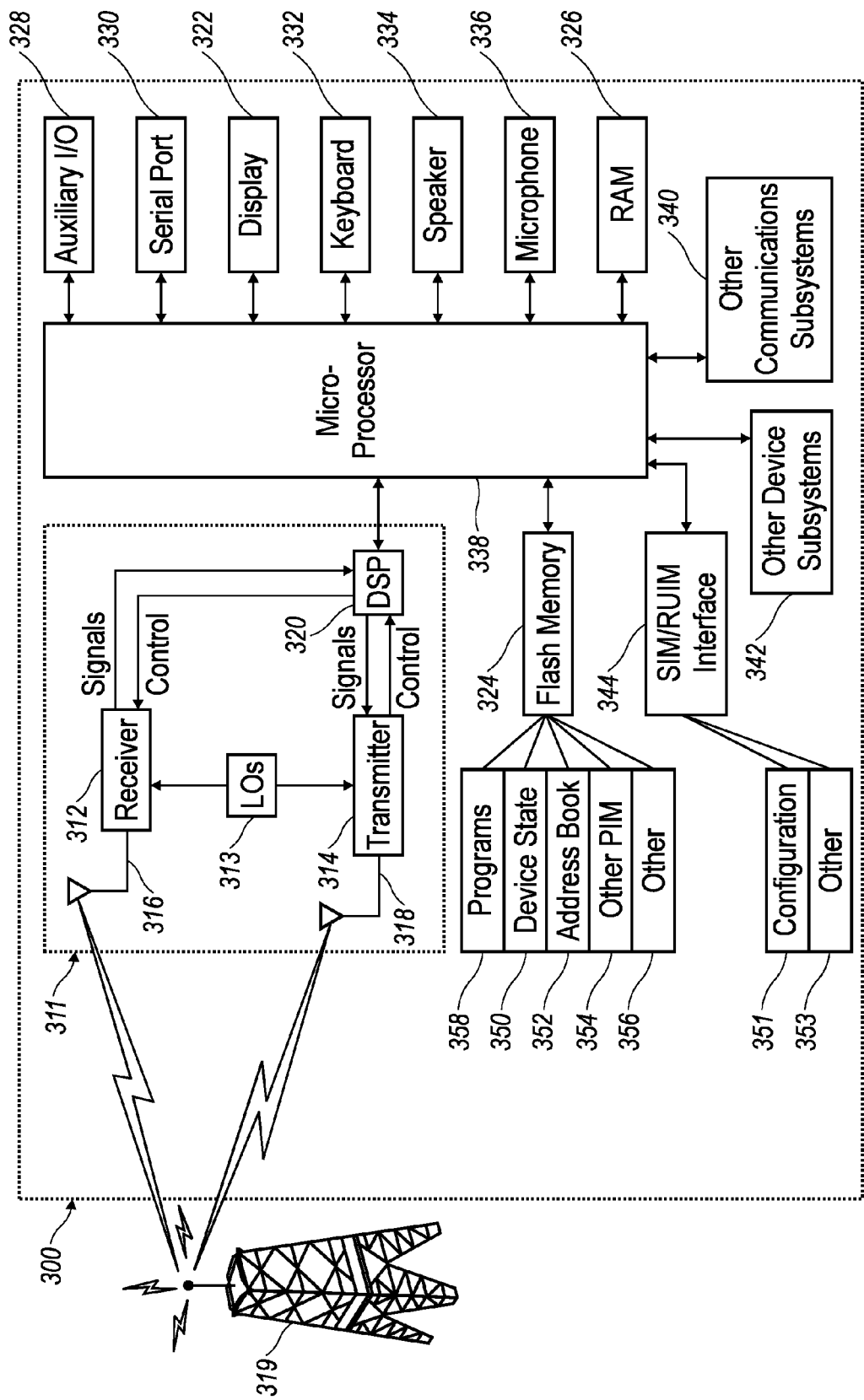
FIG. 11 is a block diagram representing a wireless handheld electronic device interacting in a communication network.

An exemplary handheld electronic device 300b is shown in the perspective view of FIG. 10a and its cooperation in a wireless network is exemplified in the block diagram of FIG. 11. These figures are exemplary only, and those persons skilled in the art will appreciate the additional elements and modifications necessary to make the device work in particular network environments.

An exemplary embodiment of the handheld electronic device 300b as shown in FIG. 10a is cradleable in the palm of a user's hand. The size of the device 300b is such that a user is capable of operating the device using the same hand that is holding the device. In a preferred embodiment, the user is capable of actuating all features of the device 300b using the thumb of the cradling hand. The preferred embodiment of the handheld device 300b features a keyboard 332 on the face of the device 300b, which is actuable by the thumb of the hand cradling the device 300b. The user may also hold the device 300b in such a manner to enable two thumb typing on the device 300b. Furthermore, the user may use fingers rather than thumbs to actuate the keys on the device 300b. In order to accommodate palm-cradling of the device 300b by the average person, it is longer (height as shown in FIG. 10a) than it is wide, and the width is preferably between approximately two and three inches, but by no means limited to such dimensions.

As may be appreciated from FIG. 10a, the handheld electronic device 300b comprises a lighted display 110 located above a keyboard 332 suitable for accommodating textual input to the handheld electronic device 300b when in an operable configuration. Preferably, the screen 110 and keyboard 332 are located at the front face of the handheld electronic device 300b. As shown, the device 300b is of unibody construction, but it is also contemplated that the device may be of an alternative construction such as that commonly known as "clamshell" or "flip-phone" style. Regardless, in the operable configuration for the device 300b, the navigation tool (auxiliary input) 328 is located essentially between the display 110 and the keyboard 332.

In one embodiment, the keyboard 332 comprises a plurality of keys with which alphabetic letters are associated on one letter per key basis. It is contemplated that the keys may be directly marked with letters, or the letters may be presented adjacent, but clearly in association with a particular key. This one-to-one pairing between the letters and keys is depicted in FIGS. 3j and 3k and is described in greater detail above in association therewith. In order to facilitate user input, the alphabetic letters are preferably configured in a familiar QWERTY, QWERTZ, AZERTY, or Dvorak layout, each of which is also discussed in greater detail above.

In the alternative embodiment of FIG. 10a, the keyboard 332 comprises a plurality of keys with which alphabetic letters are also associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

Figure 10B:
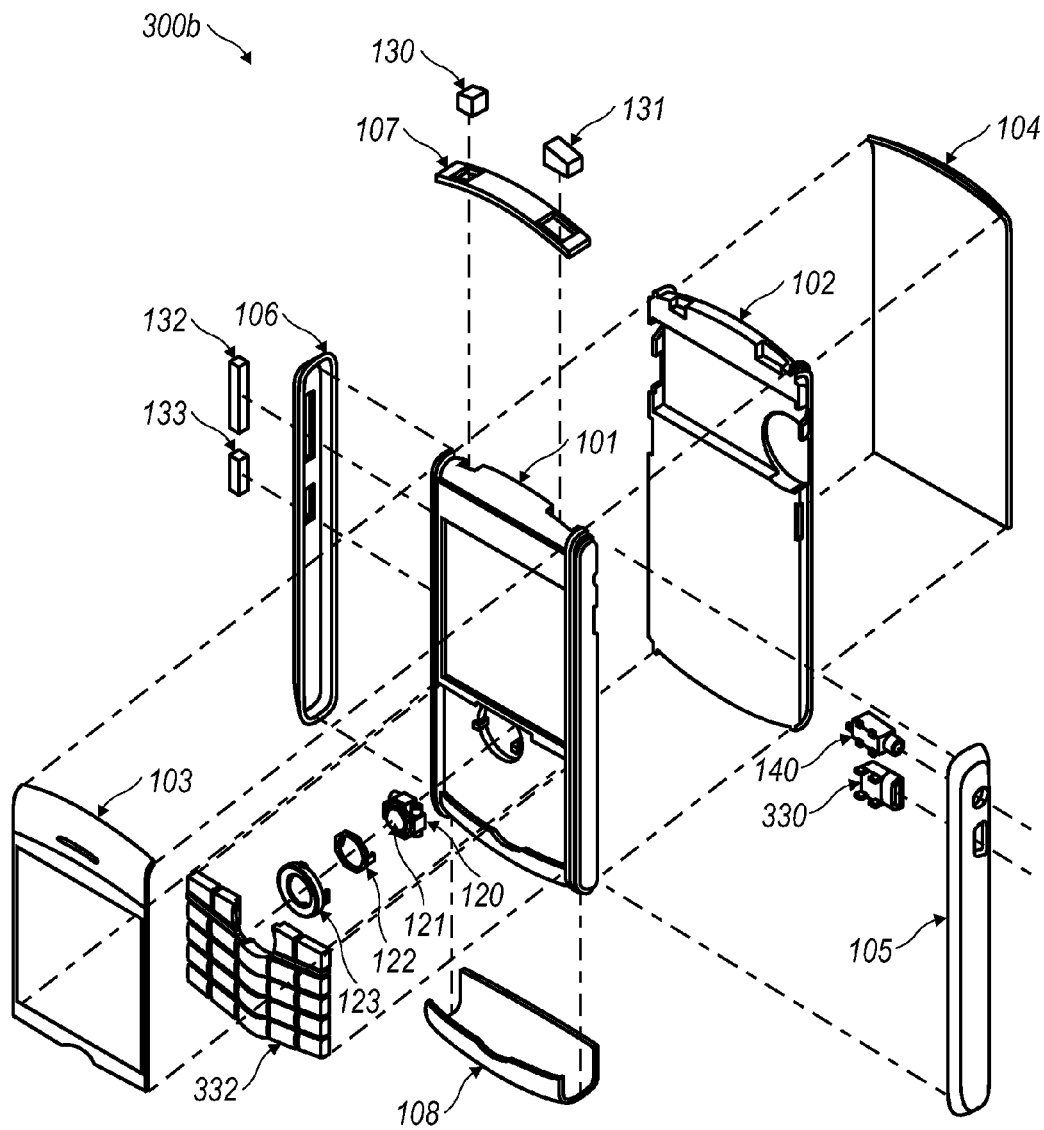
FIG. 10b is an exploded perspective view of an exemplary wireless handheld electronic device incorporating a trackball assembly as the auxiliary user input.

FIG. 10b is an exploded view showing some of the typical components found in the assembly of the electronic device 300b. The construction of the device benefits from various manufacturing simplifications. The internal components are constructed on a single PCB (printed circuit board) 102. The keyboard 332 is constructed from a single piece of material and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 120 in place above the PCB 102. The support frame 101 also provides an attachment point for the display, (not shown). A lens 103 covers the display to prevent damage. When assembled, the support frame 101 and the PCB 102 are fixably attached to each other and the display is positioned between the PCB 102 and support frame 101.

The navigation tool 120 is frictionally engaged with the support frame 101, but in a preferred embodiment the navigation tool 120 is removable when the device is assembled. This allows for replacement of the navigation tool 120 if/when it becomes damaged or the user desires replacement with a different type of navigation tool 120. In the exemplary embodiment of FIG. 10a, the navigation tool 120 is a trackball based device having a depressible rolling member or trackball 121. Other navigation tools 120 such as joysticks, four-way cursors, or touch pads are also considered to be within the scope of this disclosure. When the navigation tool 120 is a trackball based tool, the trackball 121 itself can be removed without removal of the navigation tool 120. The removal of the trackball 121 is enabled through the use of an outer removable ring 123 and an inner removable ring 122. These rings 122, 123 ensure that the navigation tool 120 and the trackball 121 are properly held in place against the support frame 101.

A serial port (preferably a Universal Serial Bus port) 330 and an earphone jack 140 are fixably attached to the PCB 102 and further held in place by right side element 105. Buttons 130, 131, 132, 133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 105, 106 provide additional protection and strength to the support structure of the device 300b. In a preferred embodiment, backplate 104 is removably attached to the other elements of the device.

The block diagram of FIG. 11 representing the electronic device 300b interacting in the communication network 319 shows the device's 300b inclusion of a microprocessor 338 which controls the operation of the device 300b. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communications subsystems 340 and other device subsystems 342 are generally indicated as connected to the microprocessor 338 as well. An example of a communication subsystem 340 is that of a short-range communication subsystem such as BLUETOOTH® communication module or an infrared device and associated circuits and components. Additionally, the microprocessor 338 is able to perform operating system functions and preferably enables execution of software applications on the communication device 300b.

The above described auxiliary I/O subsystem 328 can take the form of a variety of different subsystems including the above described navigation tool 120. As previously mentioned, the navigation tool 120 is preferably a trackball based device, but it can be any one of the other above described tools. Other auxiliary I/O devices can include external display devices and externally connected keyboards (not shown). While the above examples have been provided in relation to the auxiliary I/O subsystem, other subsystems capable of providing input or receiving output from the handheld electronic device 300b are considered within the scope of this disclosure.

In a preferred embodiment, the communication device 300b is designed to wirelessly connect with a communication network 319. Some communication networks that the electronic device 300b may be designed to operate on require a subscriber identity module (SIM) or removable user identity module (RUIM). Thus, a device 300b intended to operate on such a system will include SIM/RUIM interface 344 into which the SIM/RUIM card (not shown) may be placed. The SIM/RUIM interface 344 can be one in which the SIM/RUIM card is inserted and ejected.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300b including an address book 352, a personal information manager (PIM) 354, and the device state 350. Furthermore, programs 358 and data 356 can be segregated upon storage in the flash memory 324 of the device 300b. However, another embodiment of the flash memory 324 utilizes a storage allocation method such that a program 358 is allocated additional space in order to store data associated with such program. Other known allocation methods exist in the art and those persons skilled in the art will appreciate additional ways to allocate the memory of the device 300b.

In a preferred embodiment, the device 300b is pre-loaded with a limited set of programs that enable it to operate on the communication network 319. Another program that can be preloaded is a PIM 354 application that has the ability to organize and manage data items including but not limited to email, calendar events, voice messages, appointments and task items. In order to operate efficiently, memory 324 is allocated for use by the PIM 354 for the storage of associated data. In a preferred embodiment, the information that PIM 354 manages is seamlessly integrated, synchronized and updated through the communication network 319 with a user's corresponding information on a remote computer (not shown). The synchronization, in another embodiment, can also be performed through the serial port 330 or other short-range communication subsystem 340. Other applications may be installed through connection with the wireless network 319, serial port 330 or via other short-range communication subsystems 340.

When the device 300b is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrow-band, data-only technologies mainly used for short burst wireless data transfer.

For the systems listed above, the electronic device 300b must be properly enabled to transmit and receive signals from the communication network 319. Other systems may not require such identifying information. A GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different electronic devices 300b. The electronic device 300b may be able to operate some features without a SIM/RUIM card, but it will not be able to communicate with the network 319. In some locations, the electronic device 300b will be enabled to work with special services, such as "911" emergency, without a SIM/RUIM or with a non-functioning SIM/RUIM card. A SIM/RUIM interface 344 located within the device allows for removal or insertion of a SIM/RUIM card (not shown). This interface 344 can be configured like that of a disk drive or a PCMCIA slot or other known attachment mechanism in the art. The SIM/RUIM card features memory and holds key configurations 351, and other information 353 such as identification and subscriber related information. The SIM/RUIM card features memory and holds key configurations 351, and other information 353 such as identification and subscriber related information. Furthermore, a SIM/RUIM card can be enabled to store information about the user including identification, carrier and address book information. With a properly enabled electronic device 300b, two-way communication between the electronic device 300b and communication network 319 is possible.

If the electronic device 300b is enabled as described above or the communication network 319 does not require such enablement, the two-way communication enabled device 300b is able to both transmit and receive information from the communication network 319. The transfer of data can be from the device 300b or to the device 300b. In order to communicate with the communication network 319, the device 300b in a preferred embodiment is equipped with an integral or internal antenna 318 for transmitting signals to the communication network 319. Likewise the electronic device 300b in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300b.

When equipped for two-way communication, the electronic device 300b features a communication subsystem 311. As is well known in the art, this communication subsystem 311 is modified so that it can support the operational needs of the device 300b. The subsystem 311 includes a transmitter 314 and receiver 312 including the associated antenna or antennae (316, 318) as described above, local oscillators (LOs) 313, and a processing module 320 that in a preferred embodiment is a digital signal processor (DSP) 320.

A signal received by the electronic device 300b is first received by the antenna 316 and then input into a receiver 312, which in a preferred embodiment is capable of performing common receiver functions including signal amplification, frequency down conversion, filtering, channel selection and the like, and analog to digital (A/D) conversion. The A/D conversion allows the DSP 320 to perform more complex communication functions such as demodulation and decoding on the signals that are received by DSP 320 from the receiver 312. The DSP 320 is also capable of issuing control commands to the receiver 312. An example of a control command that the DSP 320 is capable of sending to the receiver 312 is gain control, which is implemented in automatic gain control algorithms implemented in the DSP 320. Likewise, the electronic device 300b is capable of transmitting signals to the communication network 319. The DSP 320 communicates the signals to be sent to the transmitter 314 and further communicates control functions, such as the above described gain control. The signal is emitted by the device 300b through an antenna 318 connected to the transmitter 314.

It is contemplated that device 300b communication with the wireless network 319 can be any type of communication that both the wireless network 319 and device 300b are enabled to transmit, receive and process. In general, these can be classified as voice and data. Voice communication is communication in which signals for audible sounds are transmitted by the device 300b through the communication network 319. Data is all other types of communication that the device 300b is capable of performing within the constraints of the wireless network 319.

In the instance of voice communication, voice transmissions that originate from the electronic device 300b enter the device 300b though a microphone 336. The microphone 336 communicates the signals to the microprocessor 338 for further conditioning and processing. The microprocessor 338 sends the signals to the DSP 320 which controls the transmitter 314 and provides the correct signals to the transmitter 314. Then, the transmitter 314 sends the signals to the antenna 318, which emits the signals to be detected by a communication network 319. Likewise, when the receiver 312 obtains a signal from the receiving antenna 316 that is a voice signal, it is transmitted to the DSP 320 which further sends the signal to the microprocessor 338. Then, the microprocessor 338 provides a signal to the speaker 334 of the device 300b and the user can hear the voice communication that has been received. The device 300b in a preferred embodiment is enabled to allow for full duplex voice transmission.

In another embodiment, the voice transmission may be received by the electronic device 300b and translated as text to be shown on the display screen 322 of the electronic device 300b. The electronic device 300b is also capable of retrieving messages from a voice messaging service operated by the communication network operator. In a preferred embodiment, the device 300b displays information in relation to the voice message, such as the number of voice messages or an indication that a new voice message is present on the operating system.

In a preferred embodiment, the display 322 of the electronic device 300b provides an indication about the identity of an incoming call, duration of the voice communication, telephone number of the communication device, call history, and other related information. It should be appreciated that the above-described embodiments are given as examples only and one skilled in the art may effect alterations, modifications and variations to the particular embodiments without departing from the scope of the application.

As stated above, the electronic device 300b and communication network 319 can be enabled to transmit, receive and process data. Several different types of data exist and some of these types of data will be described in further detail. One type of data communication that occurs over the communication network 319 includes electronic mail (email) messages. Typically an email is text based, but can also include other types of data such as picture files, attachments and html. While these are given as examples, other types of messages are considered within the scope of this disclosure as well.

When the email originates from a source outside of the device and is communicated to the device 300b, it is first received by the receiving antenna 316 and then transmitted to the receiver 312. From the receiver 312, the email message is further processed by the DSP 320, and it then reaches the microprocessor 338. The microprocessor 338 executes instructions as indicated from the relevant programming instructions to display, store or process the email message as directed by the program. In a similar manner, once an email message has been properly processed by the microprocessor 338 for transmission to the communication network 319, it is first sent to the DSP 320, which further transmits the email message to the transmitter 314. The transmitter 314 processes the email message and transmits it to the transmission antenna 318, which broadcasts a signal to be received by a communication network 319. While the above has been described generally, those skilled in this art will appreciate those modifications which are necessary to enable the electronic device 300*b* to properly transmit the email message over a given communication network 319.

Furthermore, the email message may instead be transmitted from the device 300*b* via a serial port 330, another communication port 340, or other wireless communication ports 340. The user of the device 300*b* can generate a message to be sent using the keyboard 332 and/or auxiliary I/O 328, and the associated application to generate the email message. Once the email message is generated, the user may execute a send command which directs the email message from the electronic device 300*b* to the communication network 319. In an exemplary embodiment, a keyboard 332, preferably an alphanumeric keyboard, is used to compose the email message. In a preferred embodiment, an auxiliary I/O device 328 is used in addition to the keyboard 332.

While the above has been described in relation to email messages, one skilled in the art could easily modify the procedure to function with other types of data such as SMS text messages, Internet websites, videos, instant messages, programs and ringtones. Once the data is received by the microprocessor 338, the data is placed appropriately within the operating system of the device 300*b*. This might involve presenting a message on the display 322 which indicates the data has been received or storing it in the appropriate memory 324 on the device 300*b*. For example, a downloaded application such as a game will be placed into a suitable place in the flash memory 324 of the device 300*b*. The operating system of the device 300*b* will also allow for appropriate access to the new application as downloaded.

While the above has been described in relation to a computer 300 and handheld electronic devices 300*a* and 300*b*, there are particular classes of these devices. A handheld communication device is a handheld electronic device 300*a*, 300*b* which is capable of communicating with a communications network which can be data, voice, or combination thereof.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for displaying a menu on a screen of a wireless handheld electronic device, said method comprising:
   displaying a cursor-navigable page on a screen of a wireless handheld electronic device without a menu showing on the cursor-navigable page;
   receiving an ambiguous request for display of menu action items corresponding to the cursor-navigable page while a cursor is positioned at a location on the cursor-navigable page;
   displaying a short menu in response to the received ambiguous request, said short menu having a first list of menu action items associated with the cursor-navigable page, said first list including items that are a subset of an extended menu having a second list of menu action items that lists all available menu action items associated with the cursor-navigable page and with an application causing display of the cursor-navigable page, said first list of menu action items having been assessed a higher probability for being user-selected than at least some action items of the second list of menu action items not included in said first list of menu action items, said first list including a menu action item for displaying the extended menu; and
   displaying the extended menu in response to a selection of a menu action item on the first list of the short menu,
   the wireless handheld electronic device being capable of transmitting data to, and receiving data from, a communication network utilizing radio frequency signals, and the data of the short menu is transmitted, via the communication network, to a central location that is separate from the wireless handheld electronic device.

2. The method of claim 1, further comprising initiating the ambiguous request for display of menu action items by actuating an auxiliary user input device on the wireless handheld electronic device.

3. The method of claim 2, wherein said auxiliary user input device is a navigation tool that controls movement of the cursor on the screen of the wireless handheld electronic device.

4. The method of claim 3, wherein said navigation tool comprises at least one of a trackball, a navigation pad, a joy stick and a thumbwheel.

5. The method of claim 1, further comprising initiating a non-ambiguous request to display the extended menu associated with the displayed page and responsively displaying the extended menu.

6. The method of claim 5, wherein said initiation of a non-ambiguous request to display the extended menu associated with the displayed page is affected by depressing a dedicated input on the wireless handheld electronic device.

7. The method of claim 6, wherein said dedicated input is a push-button on the wireless handheld electronic device.

8. The method of claim 1, further comprising providing the short menu with a menu action item that displays the extended menu associated with the displayed page when selected.

9. The method of claim 8, wherein said wireless handheld electronic device comprises a dedicated input in the form of a push-button marked with an extended menu insignia which is the same as an extended menu insignia displayed on the menu action item on the short menu that displays the extended menu when selected.

10. The method of claim 1, further comprising providing the short menu with a menu action item that closes the short menu.

11. The method of claim 1, further comprising providing a menu key for a non-ambiguous request that displays the extended menu associated with the displayed page and displaying the extended menu by activating the menu key.

12. The method of claim 1, wherein the short menu overlaps the displayed page on the screen.

13. The method of claim 1, wherein the short menu is displayed on the screen in place of the displayed page.

14. The method of claim 13, wherein the short menu fills a substantial entirety of the screen.

15. The method of claim 1, further comprising grasping said wireless handheld electronic device by a user and cradling the device in the palm of the user's grasping hand.

16. The method of claim 15, further comprising operating said wireless handheld electronic device using digits of the same hand with which the device is grasped.

17. The method of claim 15, further comprising operating said wireless handheld electronic device using the thumb of the same hand with which the device is grasped.

18. The method of claim 1, wherein said wireless handheld electronic device further comprises a keyboard suitable for accommodating textual input to the wireless handheld electronic device and a navigation tool located essentially between the keyboard and the screen of the wireless handheld electronic device.

19. The method of claim 18, said keyboard comprising a plurality of keys with which alphabetic letters are associated, one letter per key.

20. The method of claim 19, wherein said alphabetic letters are configured in one of a QWERTY, QWERTZ, and AZERTY layout.

21. The method of claim 18, said keyboard comprising a plurality of keys with which alphabetic letters are associated and wherein at least a portion of the individual keys has multiple letters associated therewith.

22. The method of claim 21, wherein said alphabetic letters are configured in one of QWERTY, QWERTZ, and AZERTY layout.

23. The method of claim 1, wherein when the extended menu is displayed, the extended menu overlaps the displayed page on the screen and fills less than the entirety of the screen.

24. The method of claim 1, including receiving from the central location, via the communication network, the data of the short menu.

25. A wireless handheld electronic device programmed to display a menu of action items on a screen of the device, said wireless handheld electronic device comprising:
   a screen on which cursor-navigable pages are displayed;
   a keyboard configured to accommodate textual input to the wireless handheld electronic device; and
   a microprocessor, communicatively coupled with the keyboard and the screen, having a control program associated therewith for controlling operation of said wireless handheld electronic device, said control program configured to process an ambiguous request for display of menu action items corresponding to a cursor-navigable page that does not include a displayed menu when the ambiguous request is detected, the ambiguous request occurring while a screen-navigating cursor is positioned at a location on the cursor-navigable page, and, based on said detection of the ambiguous request, said microprocessor:
      displaying a short menu having a first list of menu action items associated with the cursor-navigable page, the first list including items that are a subset of an extended menu having a second list of menu action items that lists all available menu action items associated with the currently displayed page and an application running and displayed on the displayed cursor-navigable page, said first list of menu action items having been assessed a higher probability for being user-selected than at least some menu action items of the second list of menu action items not included in said first list of menu action items, the short menu including a menu action item for displaying the extended menu,
      processing a non-ambiguous request for display of the extended menu, and
      displaying the extended menu in response to the non-ambiguous request,
   the wireless handheld electronic device being capable of transmitting data to, and receiving data from, a communication network utilizing radio frequency signals and the data of the short menu is transmitted, via the communication network, to a central location that is separate from the wireless handheld electronic device.

26. The device of claim 25, further comprising an auxiliary user input device useable for initiating the ambiguous request for display of menu action items.

27. The device of claim 26, wherein said auxiliary user input device is a navigation tool that controls movement of the cursor on the screen of the wireless handheld electronic device.

28. The device of claim 27, wherein said navigation tool comprises at least one of a trackball, a navigation pad, a joy stick and a thumbwheel.

29. The device of claim 27, wherein said navigation tool is located essentially between the display and the keyboard in the operable configuration.

30. The device of claim 29, said keyboard comprises a plurality of keys with which alphabetic letters are associated, one letter per key.

31. The device of claim 30, wherein said alphabetic letters are configured in one of a QWERTY, QWERTZ, and AZERTY layout.

32. The device of claim 29, said keyboard comprising a plurality of keys with which alphabetic letters are associated and wherein at least a portion of the individual keys has multiple letters associated therewith.

33. The device of claim 32, wherein said alphabetic letters are configured in one of QWERTY, QWERTZ, and AZERTY layout.

34. The device of claim 25, further comprising a dedicated input that when actuated initiates a non-ambiguous request to display the extended menu associated with the displayed page.

35. The device of claim 34, wherein said dedicated input is a push-button on the wireless handheld electronic device.

36. The device of claim 25, wherein the short menu comprises a menu action item for displaying the extended menu associated with the displayed page when selected.

37. The device of claim 36, further comprising a dedicated input in the form of a push-button marked with an extended menu insignia which is the same as an extended menu insignia displayed on the menu action item on the short menu that displays the extended menu when selected.

38. The device of claim 25, wherein the short menu comprises a menu action item that closes the short menu.

39. The device of claim 25, wherein the short menu fills a substantial entirety of the screen.

40. The device of claim 25, wherein said wireless handheld electronic device is sized to be cradleable in the palm of a user's hand.

41. The device of claim 40, wherein said wireless handheld electronic device is operable using digits of the same hand within which the device is cradled.

42. The device of claim 25, wherein when the extended menu is displayed, the extended menu overlaps the displayed page on the screen and fills less than the entirety of the screen.

43. The device of claim 25, wherein the data of the short menu is received from the central location via the communication network.

44. A method for displaying a menu on a screen of a wireless handheld communication device, said method comprising:
   displaying a cursor-navigable page on the screen without a menu showing on the cursor-navigable page;

receiving an ambiguous request for display of menu action items corresponding to the displayed page while the cursor is positioned at a location on the cursor-navigable page;

displaying a short menu in response to the received ambiguous request, said short menu having a first list of menu actions items associated with the cursor-navigable page, said first list including items that are a subset of an extended menu having a second list of menu action items that lists all available menu action items associated with the currently displayed page and an application running and displayed on the displayed page, said first list of menu action items having been assessed a higher probability for being user-selected than at least some menu actions items of the second list of menu action items not included in the first list of menu action items, the short menu including a menu action item for displaying the extended menu, and said wireless handheld electronic device being capable of transmitting data to, and receiving data from, a communication network utilizing radio frequency signals and the data of the short menu is transmitted, via the communication network, to a central location that is separate from the wireless handheld electronic device; and displaying the extended menu in response to a received signal that is caused as a result of selection, on the short menu, of the menu action item for displaying the extended menu.

45. The method of claim 44, wherein when the extended menu is displayed, the extended menu overlaps the displayed page on the screen and fills less than the entirety of the screen.

46. The method of claim 44, including receiving from the central location, via the communication network, the data of the short menu.

* * * * *